(12) United States Patent
Faqih

(10) Patent No.: US 6,574,979 B2
(45) Date of Patent: Jun. 10, 2003

(54) PRODUCTION OF POTABLE WATER AND FRESHWATER NEEDS FOR HUMAN, ANIMAL AND PLANTS FROM HOT AND HUMID AIR

(75) Inventor: Abdul-Rahman Abdul-Kader M. Faqih, Makkah (SA)

(73) Assignee: Fakieh Research & Development, Makkah (SA)

( * ) Notice: Subject to any disclaimer, the term of this patent is extended or adjusted under 35 U.S.C. 154(b) by 0 days.

(21) Appl. No.: 09/810,541

(22) Filed: Mar. 19, 2001

(65) Prior Publication Data

US 2002/0011075 A1 Jan. 31, 2002

Related U.S. Application Data

(63) Continuation of application No. 09/627,450, filed on Jul. 27, 2000, now abandoned.

(51) Int. Cl.[7] ............................................. F25D 21/14
(52) U.S. Cl. ................................ 62/285; 62/291; 62/93
(58) Field of Search ............................. 62/285, 291, 6, 62/93, 94, 121, 123, 271, 272, 467

(56) References Cited

U.S. PATENT DOCUMENTS

| | | |
|---|---|---|
| 1,816,592 A | 7/1931 | Knapen |
| 3,404,537 A * | 10/1968 | Leonard, Jr. .................. 62/123 |
| 3,675,442 A * | 7/1972 | Swanson ..................... 62/285 |
| 4,080,186 A | 3/1978 | Ockert |
| 4,134,269 A | 1/1979 | Arzet |
| 4,182,132 A | 1/1980 | Nasser et al. |
| 4,313,312 A | 2/1982 | Ito et al. |
| 4,315,599 A | 2/1982 | Biancardi |
| 4,433,552 A | 2/1984 | Smith |
| 4,584,840 A | 4/1986 | Baumann |
| 4,953,366 A | 9/1990 | Swift et al. |
| 5,165,243 A | 11/1992 | Bennett |

(List continued on next page.)

OTHER PUBLICATIONS

D. McKelvey; S. Ballaster; S. Garrett—4pPAS. "Shipboard Electronics Thermoacoustic Cooler"—ASA 130th Meeting—St. Louis, MO—Nov. 27–Dec. 1, 1995.
Roland Wahlgren—"Atmospheric Water Vapour Processing"—Waterlines vol. 12, No. 2, 20–22, Oct. 1993.

(List continued on next page.)

*Primary Examiner*—Chen-Wen Jiang
(74) *Attorney, Agent, or Firm*—Nixon Peabody LLP; Donald R. Studebaker

(57) ABSTRACT

Systems and methods are disclosed for extracting freshwater from atmospheric humidity in extremely hot and humid climates and supplying freshwater to a small group of people, a building, a farm, or forestation area. The freshwater is treated to provide drinking water by disinfecting to eliminate microorganisms and filtration to remove suspended particulates from air, erosion or corrosion products, and disinfected waste. Compact units provide drinking water for individuals, passengers in cars, vans, trucks, or recreational boats, or crewmembers on a seagoing cargo ship whether from atmospheric humidity or from moisture-laden gases. Furthermore, systems are disclosed for the ample supply of freshwater with minimal treatment for small- to large-sized buildings in a manner that alleviates the heat load on buildings. Collection of freshwater from hot humid ambient air is also provided for other uses, such as irrigation and farm animal drinking. Various methods are used for condensation of water vapor suspended in the air as alternative to conventional refrigeration cycles using CFC refrigerants. Devices are disclosed using naturally occurring brackish cold water, circulation of cooling water cooled by thermoelectric cooling or thermoacoustic refrigeration as well as evaporative cooling and transpiration cooling. Water produced by the systems may flow under gravitational forces entirely or with the assistance of boasting pumps.

14 Claims, 19 Drawing Sheets

U.S. PATENT DOCUMENTS

| | | | |
|---|---|---|---|
| 5,174,130 A | | 12/1992 | Lucas |
| 5,263,341 A | * | 11/1993 | Lucas .................... 62/467 X |
| 5,275,002 A | | 1/1994 | Inoue et al. |
| 5,295,791 A | | 3/1994 | Meise |
| 5,456,082 A | | 10/1995 | Keolian et al. |
| 5,553,459 A | * | 9/1996 | Harrison .................... 62/93 |
| 5,601,236 A | | 2/1997 | Wold |

OTHER PUBLICATIONS

Ray Radebaugh—"A Review of Pulse Tube Refrigeration"—Advances in Cryogenic Engineering vol. 35, pp. 1191–1205.

G.W. Swift—"Analysis and Performance of a Large Thermoacoustic Engine"—Journal Acoustical Society of America 84, 1145 (1988).

G.W. Swift "Thermoacoustic Engines"—Journal Acoustical Society of America 84 (No. 4), (Oct. 1988) pp. 1145–1180.

Thomas J. Hofler—"Concepts for Thermoacoustic Refrigeration and a Practical Device"—International Cryocooles Processing Conference—Aug. 18–19, 1988.

Thomas James Hofler—"Thermoacoustic Refrigeration Design and Performance"—UMI Dissertation Services—University of California San Diego 1986.

* cited by examiner

PRODUCTION OF POTABLE WATER AND FRESHWATER NEEDS FOR HUMAN, ANIMAL AND PLANTS FROM HOT AND HUMID AIR

This is a continuation of application Ser. No. 09/627,450, filed Jul. 27, 2000, now abandon.

BACKGROUND OF THE INVENTION

Field of the Invention

The invention relates generally to harvesting freshwater from atmospheric humidity in regions suffering from freshwater shortage compounded with extended periods of extremely high temperature and very high humidity to supply potable water as well as freshwater for other human uses, irrigation, and animal and poultry farms and to alleviate the heat loading for buildings. The invention also relates to collection of water from moisture rich gases in situations of emergency and when trusted freshwater is lacking.

SUMMARY OF THE INVENTION

Extreme heat in tropical regions is usually accompanied by extremes of high humidity, especially at low altitude where bayous, marshlands, swamps, shallow lakes, heavy vegetations, and forests are abundant; tropical islands, such as the Caribbean Islands; arid land and deserts nearby ocean shorelines or seashores; such as the regions in the Arabian Peninsula near the Red Sea and the Gulf. The absolute humidity in regions by and near the shores of oceans and seas could reach up to twenty-five (25) grams of water per cubic meter of air.

Generally, natural freshwater resources are scarce or limited in very hot and humid deserts and arid lands due to low precipitation and high salinity of surface and underground water. Heat strokes are also common in areas where there is no shade and building material does not provide proper protection from brunt of the harsh climate. Rural and nomadic life conditions are deteriorating due to environmental changes caused by expanding developments elsewhere.

Shortage in supply of potable water and freshwater is increasing at a vast rate, as deserts expand and overtake fertile land and as many of the natural ground water-resources are being depleted. Shift in patterns of the global climate throughout time resulted in a drop in the rate of rainfall in many areas. Hunger and starvation is spreading in Africa because of shortage of freshwater to raise domestic animals and crops for food.

Sparse population and scattered population pockets in many areas make the application of water desalination and treatment technologies uneconomical due to the low demand and the high cost of water distribution from a central system over a wide stretch of land. Transportation of loads of freshwater is costly and exposes water to contamination en route and during handling and storage.

Accordingly, there is a need for localized production of fresh water to provide water for human drinking and freshwater for raising animals and for irrigation as well as other human uses. There is also need for means to alleviate the heating load of dwellings for human and animal.

In addition, atmospheric moisture is an excellent natural source of water regardless of the amount of water vapor content of the air. The lower layer of the atmosphere surrounding the earth contains over three trillion ($3 \times 10^{12}$) cubic meter of renewable water, which is about one-thousandth (0.001) of the water stored on the surface of the earth. In comparison, the daily drinking water consumption of the earth population is about two hundred twelve million cubic meter ($2.12 \times 10^8$), which is a very modest portion of the water entrapped in the atmosphere. That is, free atmospheric water accessible to all mankind on the earth can satisfy all drinking water needs anywhere and anytime with a lot to spare for irrigation and raising farm animals. The atmospheric moisture reserve will not be depleted by excessive extraction of water since the water vapor is continuously replenished by evaporation of surface water and the surface of the mountains and valleys due to the flow of hot air.

Accordingly, there is a need for systems to harvest moisture entrapped in ambient air for provision of potable water for human and freshwater for agricultural uses including rearing of animal farms for food.

Additionally, many resorts and vacationing places are located in hot humid regions deprived from drinking water and freshwater since they are on spreads of arid lands by shorelines wherein groundwater is brackish and rainfall is rare. In spite of the popularity of those areas, construction of desalination plants to produce freshwater for tourists is not economically viable due to the briefness of the tourism seasons and decline of demand most of the year. Reliance on bottled water is expensive for the average consumer while this source will not provide freshwater for other uses.

Accordingly, there is a need for systems for local water production from atmospheric humidity to supply fresh water to cabins, camping areas and tourist areas during tourism seasons in regions characterized by humid hot weather throughout the busy seasons. Systems compatible with tourist regions should reduce expenditure on drinking water and provide excess water for other human uses as long as the weather conditions are appropriate.

Travel across arid lands and deserts exposes travelers to shortage of water, or lack of trusted sources of water. Loading sufficient potable water on land vehicles could be cumbersome and may be impossible in some situations. Similarly, passengers on recreation boats or seagoing ships can be exposed to the risk of water shortages during their excursions.

Accordingly, there is a need for portable freshwater producing systems that can supply freshwater and potable water on land vehicles and seagoing vehicles, utilizing available water resources, such as atmospheric humidity and moisture-laden exhaust gases from internal combustion engines.

Installing large freshwater tanks over land vehicles for long trips across vast stretches of desert is impractical. Similarly, carrying sufficient freshwater supply or installation of desalination units or water reuse units aboard large seagoing boats reduces cargo space and minimizes the benefit from surface areas on the boat and increases the load.

Accordingly, there is a need for lightweight and freshwater producing systems characterized by small footprints that can supply freshwater and potable water on large land vehicles and seagoing ships.

In situations of emergency, water supply systems may be contaminated or interrupted by natural disasters or man made catastrophes and shortage of clean freshwater and potable water can lead to spread of diseases.

Accordingly, there is a need for mobile and portable water production equipment that can supply non-contaminated freshwater and potable water for a small or larger group of people on temporary basis until the main supply of water resumes operation.

Thermoacoustic refrigeration engines have been developed and are in use in the US National Laboratories, the US Department of Energy and the National Institute of Science and Technology, the US Department of Commerce. The machines are currently used for crycooling in special experiments.

In recent years concerns with the ozone depletion and global warming problems have become additional focal points of the Heating Ventilation Air Conditioning and Refrigeration (HVAC&R) research programs. Approximately one-third of the chlorofluorocarbons (CFCs) consumed in the U.S. are us refrigeration and air-conditioning. CFCs are considered a major factor in ozone depletion and global warming problems. The changeover from CFCs to alternative refrigerants impacts equipment design and have a significant impact on energy use.

In the latest development in refrigeration, high-intensity sound waves are used to create superhot gas molecules. The gas molecules transfer their heat to inert coils and then expand and cool; effectively creating a refrigerator that can be adjusted by a volume-control knob. Advantages over conventional refrigerators include the elimination of ozone-destroying gases, reduction of components to a single moving part, and the ability to precisely control the cooling cycle. Thermoacoustic cooling has been used in space shuttles, and it remains a future hope for automobile air conditioners and refrigerators in homes and boats. Accordingly, intensive efforts are expended in application of such capabilities in development of air conditioning units for automobiles to replace current devices that use Freon and other CFC refrigerants, which are harmful to the environment. A thermoacoustic cooling device was manufactured to cool drinks in tin containers.

Harvesting the water carried by atmospheric moisture enhances the utilization of natural resources in areas of scarce water supply and in applications where the transport of water poses a problem, such as the case of potable water supply as well as in maintenance of trees and greenery in tropical arid regions. The use of an environmentally benign cooling capability makes the exploitation of this water source attractive. Dependent on the amount of water needed the thermoacoustic engine can be used indoors. Extraction of humidity from the air provides cooling which can substitute for energy-intensive air conditioning systems, since the effective temperature increases with the increase in humidity of the air intake. A laboratory test of a thermoacoustic cooler, 227 W of acoustic power was used to provide 419 W of useful cooling power, corresponding to a coefficient of performance of 1.85. Taking into account the 54% electro-acoustic efficiency of the loudspeakers, the thermoacoustic cooler provided 1 W of cooling for each watt of electrical power input.

Accordingly, there is a need to develop systems that utilize energy-efficient environmentally benign thermoacoustic cooling to produce freshwater from hot humid air for supply of potable water and freshwater for different uses.

Harvesting of moisture from ambient air has been an old art. Two thousand years ago, the Nabatian Arabs, whose Kingdom embraced the Northern part of Saudi Arabia, harnessed, stored and conveyed water through an extensive system of public and private, wells, reservoirs, pipelines and channels. They gained fame for sophisticated hydraulic works such as dams and water channels. For areas close to water bodies, they collected water from the atmospheric moisture using caves in the mountains. The relatively warm air was allowed to pass through special man-made openings carved in the rocks. The water vapor condenses on the cold walls and flows by gravity in conduits or grooves in the stone walls. The produced fresh water is then collected by cisterns and stored in reservoirs below the collection areas. Near the Red Sea, they tunneled wide deep caverns under the mountains for condensation of water vapor carried by the air. Currently, there is a farm in that area, near Petra, that quite successfully imitates the old ways.

A passive system being used from ancient times in desert regions consists of a massive beehive-shaped block of concrete or stone pierced with many holes. A complex cycle involving radiation into the clear night sky of the desert allowed small amounts of water to be recovered from a very dry atmosphere. In tropical areas, such a device is very productive if the night sky is not often overcast.

Archaeologists have discovered that the ancient city of Theodosia, situated in one of the driest sections of Crimea, Ukraine, was abundantly supplied with water 2,300 years ago by taking water from the air instead of the earth. A beehive structures on hill draws moisture from atmosphere and holds it in reservoir. Thirteen great heaps of broken limestone were loosely piled on a nearby hilltop. Ducts led moisture condensing from the air within these piles to the fountains of the city, and there is no record that they ever ran dry.

On the coast of Oman large cold surfaces were placed on the top of a coastal mountain ridge to collect water from the early morning water vapor.

Very low technological approaches have been utilized from the earliest times. For example, caverns near the Red Sea wherein dew and fog would condense on the cool walls and be collected in "gutters" carved into the walls. However, attempts to do this on a larger scale and/or with more modern artificial cooling have not yet materialized on a wide scale.

A semi-active moisture/condensation system produces potable water simply by sucking the air through an array of underground pipes plumbed into the house's cold water system. The system is mounted in the basement or crawlspace of an otherwise conventional home. The chill of the earth causes sub-cooling of humid air entering the basement from grade level, condensing some of the moisture.

In St. Croix, the Virgin Islands, cold water was brought up from the deep ocean, run through condensation coils to extract fresh water from the atmosphere. Then the nutrient rich seawater was used in an aquaculture system.

Prior art encompasses inventions that utilize chemical adsorbents to extract moisture from atmospheric air or moisture-laden gases to produce fresh water or drinking water after appropriate treatment. The adsorbent is then regenerated and recycled for reuse. The use of adsorbents may be necessary in cases wherein insignificant amount of moisture is present in the atmosphere whereas in the case of extremely hot and humid environments the use of chemicals seems to be a nuisance and would require additional steps for extraction of water and regeneration of the chemicals. In addition, such systems require technical care in operation and maintenance, unlikely to avail the people and areas in dire need for water.

DESCRIPTION OF THE PRIOR ART

U.S. Pat. No. 1,816,592 discloses an aerial well comprising: a dome-like, perforated shell of stone and mortar, with a thickness of 2.5 to 3 meters to prevent the penetration of the sun's heat; a mushroom like inner core of concrete, pierced with numerous ducts for the circulation of air; a central pipe with its upper opening above the top of the outer dome. At night, cold air pours down the central pipe and circulates through the core as shown in the diagram. By morning, the whole inner mass is so thoroughly chilled that it will maintain its reduced temperature for a good part of the day. Warm, moist outdoor air enters the Central chamber, as the daytime temperature rises, through the upper ducts in the outer wall. It immediately strikes the chilled core, which is studded with rows of slates to increase the cooling surface. The air chilled by the contact, gives up its moisture upon the slates. As it cools, it gets heavier and descends, finally leaving the chamber by way of the lower ducts. Meanwhile the moisture trickles from the slates and falls into a collecting basin at the bottom of the well. By this principle, it is possible to obtain as much as 22,710 liter of water daily for every 93 square meter of condensing surface. This patent was implemented over half a century ago in southern France for extracting water from the air to irrigate fields and vineyards. Towering 12 meters above a hilltop overlooking the little town of Trans-en Provence, the structure resembles nothing more than a monstrous beehive. Its grayish-white walls of stone are perforated with scores of openings. Warm outdoor air entering through these ducts is systematically stripped of its moisture by contact with the chilly interior, much as dew condenses on a pitcher of ice water.

U.S. Pat. No. 4,313,312, for example, discloses a water producing air conditioning system comprising a water producing apparatus that adsorbs moisture in the ambient air on an adsorbent or absorbent and evaporates water adsorbed on the adsorbent or absorbent by heating it and condenses steam to obtain water. A heat exchanger exchanges heat between ambient air and hot dry air discharged from the water producing system during adsorbing moisture on the adsorbent or absorbent. An evaporation-cooling system is used for forming a cold wet air by evaporating water and cooling it by contacting water with a dry air at the ambient temperature passed through the heat exchanger. The hot air heated by the heat exchanger or the cold air obtained from the evaporation-cooling system is utilized for the air conditioning. The system can be used for comfortable living in a severe condition such as a desert by the effective combination of the evaporation-cooling apparatus with the water-producing device utilizing high efficiency heat-exchange. Evaporative cooling was used in this disclosure as the main method for air-cooling, however evaporative cooling was not used, as an assistive means for supplementing cooling by convection of a cold-water steam was not mentioned.

In addition, U.S. Pat. No. 5,601,236 teaches an autonomous plant watering device and a method for promoting plant growth for arid climatic regions. The device includes an absorption cycle atmospheric vapor condensation unit that may be solar powered, to deliver water and accumulate the collected water in a storage tank. The stored water is supplied to a subsurface, site-specific delivery system located intimately with a target plant. To assure growth enhancement, the apparatus utilizes fuzzy logic supervision provided with local sensing means and historical vapor pressure maps to control and predict water usage while controllably supplementing the delivered water with nutrients and anti-transpirants as needed. The device disclosed by this patent is used for site specific watering intimately incorporated with the target plant, which is not the case with the present invention.

The aforementioned inventions and others that may fall under the same category do not relate to the present invention since they are based on the use of adsorbents, desiccants and hygroscopic material, and mostly address hot low humidity climate conditions; which is not of concern to the present invention.

Heat pipes are used in some inventions to cool a condensing surface below dew point to precipitate the water vapor from the atmosphere. Heat pipes are also used to control indoor environment. However, the present invention is not based on this type of technology exploitation and inventions.

Prior art has also encompassed processes that rely upon heat convection in large structures and the control of the process to obtain freshwater from atmospheric humidity. Tropical and subtropical regions having high ambient temperatures and relative humidity can be locally subjected to cooling and dehumidification according to U.S. Pat. No. 4,182,132, by a tower in which, upon a post or other vertically extending support, a pair of vertically aligned spaced apart air guides are provided. The lower air guide includes the cooler that can simultaneously condense moisture from the air while the upper air guide can include a heat dissipater of a refrigeration cycle. The air guides are associated with blowers and inducing ambient air into the air guide at a location between them and displacing the air through the air guides into heat exchanging relationship. The tower can also be used to collect potable (drinking) water by condensation from the atmosphere.

U.S. Pat. No. 4,433,552 describes a system for recovering atmospheric moisture utilizing a wind driven electrical generator for powering a mechanical refrigeration system for condensing atmospheric moisture. A turbine is mounted on a housing forming an atmospheric duct. The turbine is driving a connected electrical generator. The refrigeration system includes an evaporator positioned in the atmospheric duct whereon water vapor is condensed. Electrical current is generated from wind to power the refrigeration system, which includes the evaporator. Atmospheric moisture is condensed on the evaporator and collected.

U.S. Pat. No. 4,080,186 describes a device to extract useful energy and fresh water from moist air, with an associated removal of pollutant particles entrained in the extracted water. The device comprises an enclosure with a tall stack and an extended base that has means for the creation and utilization of a contained tornado, which is powered by the energy release associated with the rapid condensation of water from the incoming moist air. This patent is based on atmospheric conditions that do not pertain to the present invention.

The above inventions that rely upon heat convection in large structures in extraction of freshwater from the atmosphere and cooling or dehumidification of local open space do not relate to the present invention, which is based on processes that are mostly performed within relatively compact structures.

In contrast, very limited production of water for irrigation was disclosed in U.S. Pat. No. 4,315,599 that describes a method and a device for automatically watering vegetation whereby the water requirement is constantly monitored. A cooled condensation surface selectively condenses water vapor out of the atmosphere and collects the condensed moisture for application onto the soil containing vegetation. Various accessories are provided to automatically feed the vegetation and distribute water to the soil containing the vegetation. The device uses thermoelectric principles to provide the required watering requirements, however, the patent does not disclose a hand-held or a portable device for providing potable water during emergencies.

Domestic central air conditioning units used to cool homes or any other buildings operate in combination with air directing units that produce a quantity of waste condensate. The water formed by condensation taken out of the air was utilized in a lawn watering system that was disclosed in U.S. Pat. No. 4,134,269. A device is designed for continually collecting the waste condensate from the central air conditioning unit. The water is stored in a holding tank. At a predetermined level in the tank, a pump is switched on to deliver the water to a hose system in the lawn. The system intermittently and automatically distributes the condensate throughout a region to be irrigated. The device comprises a holding tank for collecting the waste condensate; a drainage conduit for directing the waste condensate from the air conditioning unit to the holding tank; a depth sensing device is used indicating the level of the waste condensate collected in the tank; a pump that is automatically turned on by the depth sensing device to pump collected waste condensate from the holding tank when the depth sensing device indicates that the level of condensate in the tank has reached a predetermined maximum and automatically turned off by the depth sensing device when the depth sensing device indicates that the level of condensate in the tank has reached a predetermined minimum thus allowing the condensate to refill the tank to the predetermined maximum level; a discharge conduit associated with the pump; and an irrigation system for directing the waste condensate from the holding tank throughout the region to be irrigated.

Prior art on thermoacoustic cooling and refrigeration is concerned with different types of design of the thermnoacoustic-cooling engine. Examples are, U.S. Pat. No. 5,456,082 that describes a pin stack array for thermoacoustic energy conversion, U.S. Pat. No. 5,295,791 that discloses a tapered fluid compressor and refrigeration apparatus, U.S. Pat. No. 5,275,002 teaches a pulse tube refrigerating system, U.S. Pat. No. 5,174,130 discloses a refrigeration system having standing wave compressor, and U.S. Pat. No. 4,584,840 describes a cooling machine or heat pump having a thermoacoustic work system that has a heat source and a heat sink coupled with at least one thermoacoustic drive system of like construction. In addition, an acoustic cryocooler with no moving parts is formed from a thermoacoustic driver driving a pulse tube refrigerator through a standing wave tube was disclosed in U.S. Pat. No. 4,953,366. Only U.S. Pat. No. 5,165,243 discloses a compact acoustic refrigerator for cooling electronic components.

None of the prior art references benefit from thermoacoustic refrigeration or thermoelectric cooling using water as a cooling fluid to cool the condensation surfaces and provide potable water on a small or large scale. In addition, the use of combinations of natural cold brackish water, transpiration cooling and evaporation cooling to condensate atmospheric humidity was not disclosed in prior art.

Furthermore, none of the prior inventions discloses devices or means for utilization of building architecture to provide an aesthetically acceptable system to provide freshwater from hot humid outdoor ambient air while reducing the heat load on the structure. Integration of water production from air moisture for human use, irrigation, or animal farms and the environment is one of the unique features of the present invention.

According to the present invention, thermoacoustic refrigeration is used to cool freshwater circulating in pipes and coils to cool condensation surfaces of different topologies to temperatures below dew point to produce freshwater and drinking water by condensation of water vapor from atmospheric humidity in high temperature and high humidity climates. In a second aspect of the invention, devices or production of freshwater and drinking water use condensation of water vapor from moisture-laden gases such as the exhaust of internal combustion engines. In a third aspect of the invention, thermoelectric cooling was used to cool freshwater for condensation of water vapor from hot humid gas to supply a limited quantity of freshwater. In a fourth aspect of the invention, cooled water and evaporation cooling were used to condensate and cool freshwater condensates from atmospheric moisture. In a fifth aspect of the invention, the water vapor condensation surfaces were integrated with building structures to produce ample quantities of water from outdoor air and alleviate the heat loads. In a sixth aspect of the invention, aesthetically accepted systems are provided for supplying water to animal farms and to forested areas. In a seventh aspect of the invention, a modular system was provided for collection of water from the atmosphere using natural brackish water cooling supplemented by transpiration cooling and evaporative cooling.

It is an object of the present invention to provide a device and a process for condensation of water vapor entrained in hot humid air by flat condensation plates surfaces of varying surface areas. Surface areas of the plates can be expanded from small limited areas to cover large wide areas dependent on the desired quantity of condensate.

It is another object of the present invention to provide a device for freshwater production, using condensation surfaces that can condensate large quantities of water vapor per unit surface area, wherein special coatings are applied with some degree of surface roughness.

It is a third object of the present invention to provide a freshwater producing device using thermoacoustic cooling and parallelopiped sectioned condensation chamber to condense atmospheric humidity.

It is a fourth object of the present invention to provide a freshwater producing device using thermoacoustic cooling and conical multi-layer condensation chamber to condense atmospheric humidity.

It is a further object of the present invention to provide a thermoelectric device using cylindrical condensation chamber to condense atmospheric humidity for supply of freshwater to a small group of people.

It is a still further object of the present invention to provide a thermoelectric device using cylindrical condensation chamber to condense atmospheric humidity for supply an individual with potable water.

It is yet a further object of the present invention to provide a device and a process for producing cold potable water for a large number of people using cold water to cool condensation fins in a cylindrical configuration as well as evaporative cooling.

It is a still further object of the present invention to provide a system for supply of freshwater to a building through condensation of moisture from outdoor ambient air by a condensating roof structure that also alleviates the heat loading on the living space.

It is a still further object of the present invention to provide a system of condensating surfaces attached to the exterior walls of a building for supply of freshwater through condensation of moisture from outdoor ambient air.

It is a still further object of the present invention to provide a system for supply of freshwater to a building through condensation of moisture from outdoor ambient air by condensating surfaces integrated into the architecture of the building.

It is a still further object of the present invention to provide a device for supplying drinking water to poultry and farm animals produced from atmospheric moisture.

It is a still further object of the present invention to provide an irrigation system blending with the surroundings for watering trees in a forested area produced from atmospheric moisture.

It is a still further object of the present invention to provide a modular system for collection of freshwater from the atmosphere to supply potable water for human and fresh water for irrigation and drinking water for farm animals using natural cold brackish underground water to cool condensation surfaces with the assistance of transpiration cooling and evaporative cooling.

It is a still further object of the present invention to provide a modular system for collection of freshwater from the atmosphere to supply potable water for human and fresh water for other human usage using natural cold brackish deep cold seawater to cool condensation surfaces with the assistance of transpiration cooling and evaporative cooling.

In a first embodiment of the invention, a thermoacoustic refrigeration engine continuously cools water circulating in a closed tube-coil arrangement by a water pump. The cooling water flows through a tubing and a set of coils in a plane configuration rigidly connected to a rough metallic plate coated by a material that enhances drop-wise condensation of water vapor. By cooling the plates to a temperature below the dew point, heat exchange between the plates and the hot humid air naturally flowing in contact with the surface of the plates strips the air from humidity and cools it. Condensate from water vapor condensing on the cold surfaces is collected as freshwater. The quantity of production of freshwater depends on the surface area of the plates, providing the temperature of the surface is kept below the dew point. In principle, any quantity of water can be produced by scaling up the surface area of the plates. The footprint of the system can be reduced by stacking several plates and subjecting their coated surfaces to the prevailing wind or air moving direction.

The first aspect of the invention also relates to forcing the flow of ambient air to blow within the vicinity of and in intimate contact with the cooled condensation surfaces. This is accomplished by placing the condensation surfaces in a closed chamber wherein hot humid ambient air is blown by an air blower inside the chamber entering from one side and exiting from an opposite side.

In another embodiment of the first aspect of the invention the condensation chamber is a two section elongated box with a large rectangular air entrance and a smaller rectangular air exhaust. The condensation surfaces are provided by thin wide fins placed on the circumferences of the cooling coils. Condensate is collected by a conical funnel and pumped through a filter to a storage and supply tank.

In a different embodiment of the first aspect of the invention, the condensation chamber is constructed from layers of concentric metallic sheets forming a cone wrapped with cooling coils. Hot humid air is drawn from the wide mouth of the chamber to force it through the narrow mouth.

The two-section rectangular box-shaped and the conical condensation chambers are used in the second aspect of the invention to condensate water vapor from the exhaust of an internal combustion engine by directing the exhaust with a blower to the interior of the chamber in the water producing device. In hot humid climates the moisture-laden exhaust gas will be mixed by hot humid ambient air.

In the third aspect of the invention, hot humid air, engine exhaust or a mixture of both is drawn through a condensation chamber containing a spiral of cooling coils as the condensation surfaces. In another embodiment of the third aspect of the invention, condensation is enhanced by placing fins on the circumference of the coils. Cooling water is supplied by a thermoelectric cooler powered by a bank of chargeable batteries for a device that supplies a limited quantity of freshwater from condensate collected and filtered in a small storage tank.

A size of a device as small as a hiking canteen or a thermos to supply drinking water in emergencies for one individual is provided in a different embodiment of the third aspect of the invention. The bottom of the device allows the attachment or screw of a cup or a small container to fill it with filtered water for drinking. The cup can be thermally insulated or wetted for coolness of water.

In the fourth aspect of the invention, cooling freshwater produced by a refrigeration system is supplied by tubes and coils to a cylindrical condensation unit formed from finned surfaces and coils. The condensation surfaces condensate atmospheric moisture to produce freshwater. Further cooling of the water leaving the condensation coils is achieved by evaporative cooling. The collected condensate is stored in a tank wherein the water is treated by ozonation and filtered before dispensation. The water flow is driven by pumps and controlled by valves and water level sensors. In one of the embodiment of the fourth aspect of the invention, evaporation cooling is provided by a pot in the middle of the condensation unit wherein the cooling water terminates after cooling the condenser and thus carrying the heat reject from the hot humid air. Other embodiments include using a small water tower, and placement of the pot outside the condensation unit. The pots and the tower are fabricated from porous material such as ceramics or non-glazed clay. The evaporative cooling of water filled containers is caused by the relatively dry cool air resulting from the heat exchange of the humid hot air with the condensation surfaces. Cooling is provided by thermoelectric cooler. Alternately, thermoacoustic cooling or gas refrigerants may be used.

In a different embodiment of the fourth aspect of the invention, the system is used to provide separate large basins for irrigation water and drinking water for farm animals. Untreated product water is drained in each basin and nutrients and appropriate chemicals are added.

In the fifth aspect of the invention, water vapor condensation surfaces were integrated with building structures to produce ample quantities of water from hot humid outdoor ambient air and to alleviate heat loads from the hot humid weather and from the irradiation by direct sunrays. In one of the embodiments of this aspect of the invention, the roof is covered by densely placed staggered metallic sheets having grooves with a slope leading to gutters and draining spouts to collect the condensate and direct it to a water distribution facility. Pipes of cooling water are used to cool the condensation surfaces wherein water is circulated by pumps and cooled by a thermoacoustic cooler. In a second embodiment of the fifth aspect of the invention, metallic sheets cooled by pipes of circulating cold water are placed on the external sidewalls in an arrangement that promotes condensation of water vapor from outside ambient air. The condensation sheets are aesthetically arranged to blend with the building architecture. Conduits, pipes and spouts collectively direct product water to the distribution facility. The roof coverage and the sidewall condensation sheets are combined to provide larger supply of freshwater and more protection from the heat in a third embodiment of the fifth aspect of the invention. Natural cold-water sources may be used in place of thermoacoustic cooling wherever available.

In an embodiment of the sixth aspect of the invention, a system is provided for supplying farm raised animals and poultry with drinking water, using thermoacoustic cooling engine to cool water for circulation in a vertically assembled cylindrical arrangement of water pipes with fins for condensating water vapor. Ambient hot humid air is directed downward by air blowers to have an intimate contact with the surfaces of the fins. A shading cover protects the pipes from the sun and help directing the hot humid air downward. The condensate is drained into a container at the bottom of the cylindrical assembly wherein nutrients and solutions of preventive medicine are added to the drinking water. The water is then dispensed on demand to the farm animals or poultry.

The other embodiment of the sixth aspect of the invention provides a sculpture of an artificial wooden tree with an outer surface made from natural bark for watering a forestation area. The artificial tree trunk is equipped with a thermoacoustic cooling engine, a storage tank, a water distribution system, and pipes for communicating cooling water to the condensation surfaces provided by metallic wide leaves with thin branching tubes for cooling. Fur-like fins cover the artificial leaves. The condensate collected from water vapor entrained in hot humid air drains in the storage tank inside the trunk. Nutrients and chemicals are added to the water as needed for health growth of the trees. The water is distributed through buried plastic pipes that resemble the roots of a tree to deliver water on demand to natural trees. The water supply system is located in a manner that allows free flow of hot humid air around the leaves, and is aesthetically integrated with the wooded area.

In the seventh aspect of the invention, a modular system is provided for collection of water from the atmosphere using natural cold brackish water from a natural source such as a deep well, for cooling condensation units formed from coils, plates and fins. The cooling water is pumped to the top of an assembly of a stack of modular containers, manufactured from ceramics or metal covered with water absorbing material. The cooling water flows downward by gravity outside the containers and through the coils. Hot humid air is blown inside the containers for condensation of the water vapor content and the product condensate fall by gravity through the containers to a holding tank for treatment and distribution of freshwater. The wetted containers are cooled by cold air driven through an air radiator causing evaporative cooling of the outside surface of the containers. When ceramic containers are used, transpiration cooling plays a supplementary role in the cooling process. The number of containers depends on the quantity of freshwater required and the amount of coolness provided by the brackish water. The product freshwater can be used for irrigation, for animal drinking, or for production of potable water and other human usages.

In another embodiment of the seventh aspect of the invention, the modular system uses deep seawater as coolant to provide potable water and freshwater aboard ships. For potable water supply proper water treatment is necessary and is dependent on sources of pollution and contamination of the air and the product water.

BRIEF DESCRIPTION OF THE DRAWINGS

FIG. 11b shows the cooling and water production equipment of the system of FIG. 11a.

FIG. 15b shows a cross-section of the air radiation component of the system of FIG. 15a.

FIG. 15c shows the method of connecting the units of the system of FIG. 15a.

DETAILED DESCRIPTION OF THE INVENTION

Figure 1:
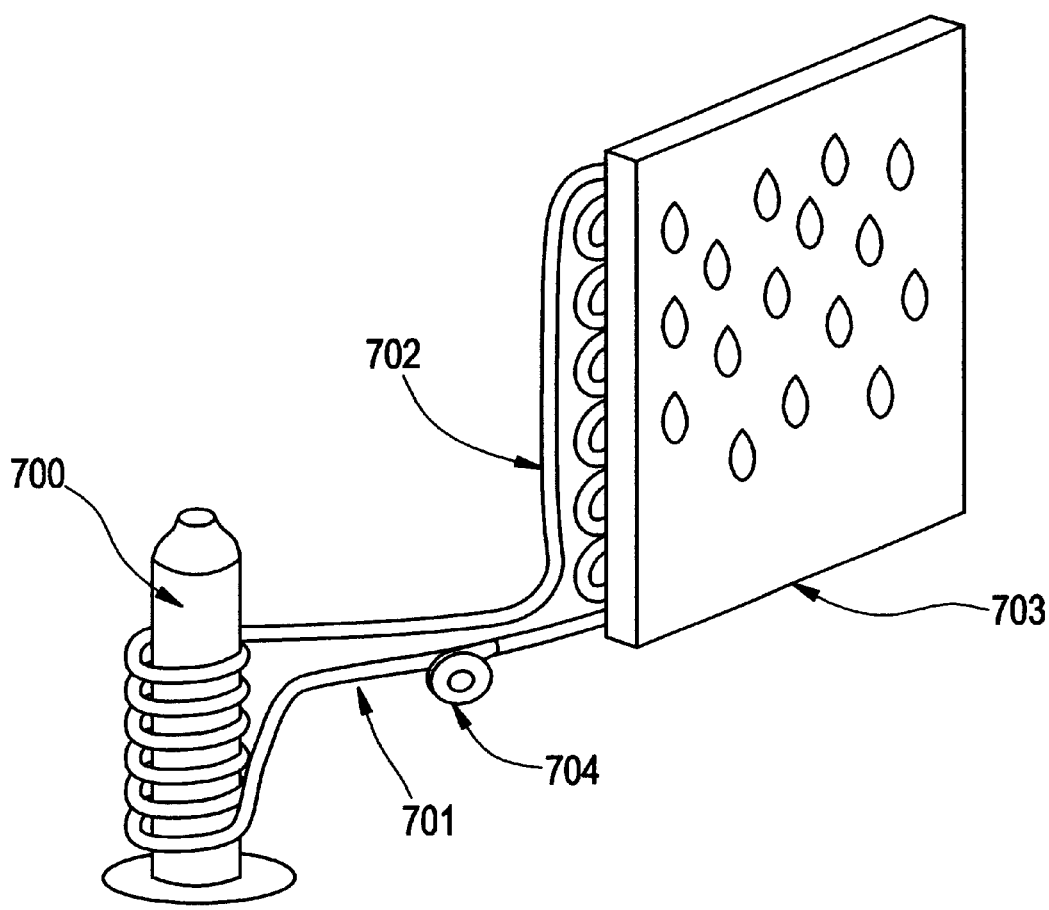
FIG. 1 shows a simple apparatus for condensation of water vapor from hot humid ambient air using a thermoacoustic refrigeration engine to produce chilled water flowing through coils that cool an extended condensation surface.
Figure 2A:
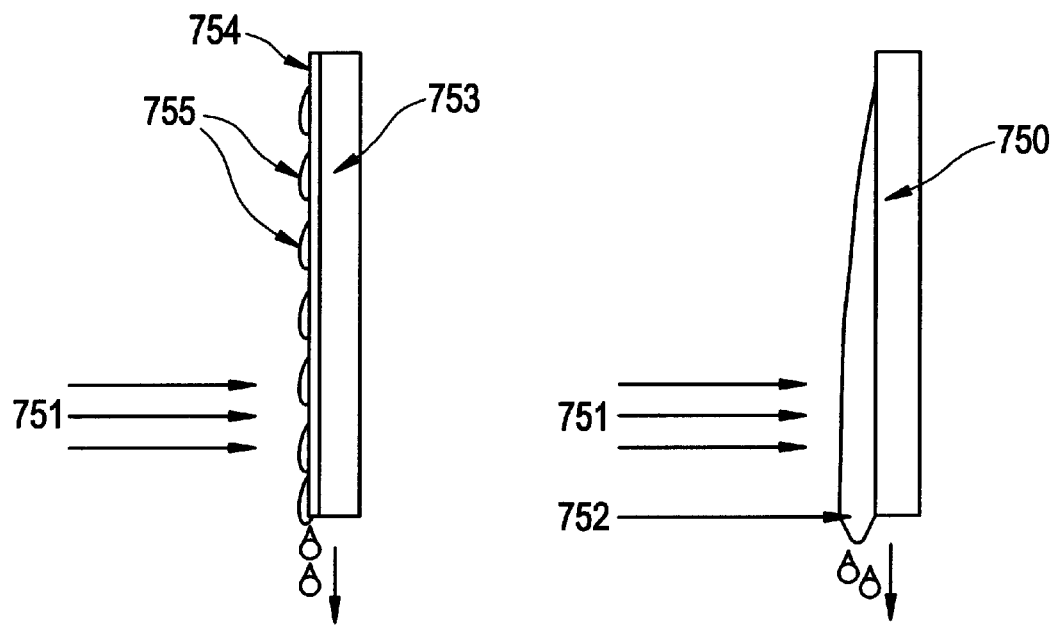
FIG. 2a presents a comparison between drop-wise condensation and film condensation of water vapor on a vertical condensation surface.

FIG. 1 shows the configuration and components of a simple apparatus for condensation of water vapor from the atmosphere wherein a thermoacoustic refrigeration engine 700 is used to cool freshwater flowing through the tubing 701 directly connected and feeding a plurality of coils 702 in intimate contact with a flat condensation plate 703. The coils 702 may soldered to the flat plates 703. The water pump 704 drives the water flow and circulates the cooling water in the combined tube 701 and coils 702 path to provide and maintain continuous cooling of the plate 703. As the moisture-laden ambient air passes in intimate contact with the plate 703, heat exchange takes place between the hot humid air stream and the cold surface and freshwater condensates drips down by gravity. To enhance the rate of condensation, air may be blown across the surface at a slow speed and to prevent air stagnation by the surface in case of calm airflow. Air blowers blow a stream of hot humid ambient air across the plate 703, in case of using the apparatus indoors or in a place wherein airflow is not sufficient. The amount of cooling, required to condensate the moisture from the air, is small since the temperature of the condensating plate 703 has to drop only a few degrees under ambient air temperature to reach the dew point. The surface of the condensating plate 703 must be rough, corrugated and may be covered with hair like fins to enhance condensation of water vapor. Preferably, a thin film of silicon or teflon or any other material of similar texture is used to coat the condensating plate 703. The coating promotes drop-wise condensation and prevents the formation of a thin water film on the surface that could hinder the continuation of the condensation process as shown in FIG. 2a, for a vertically oriented condensation surface and FIG. 2b, for horizontal orientation of the condensation surface.

Figure 2B:
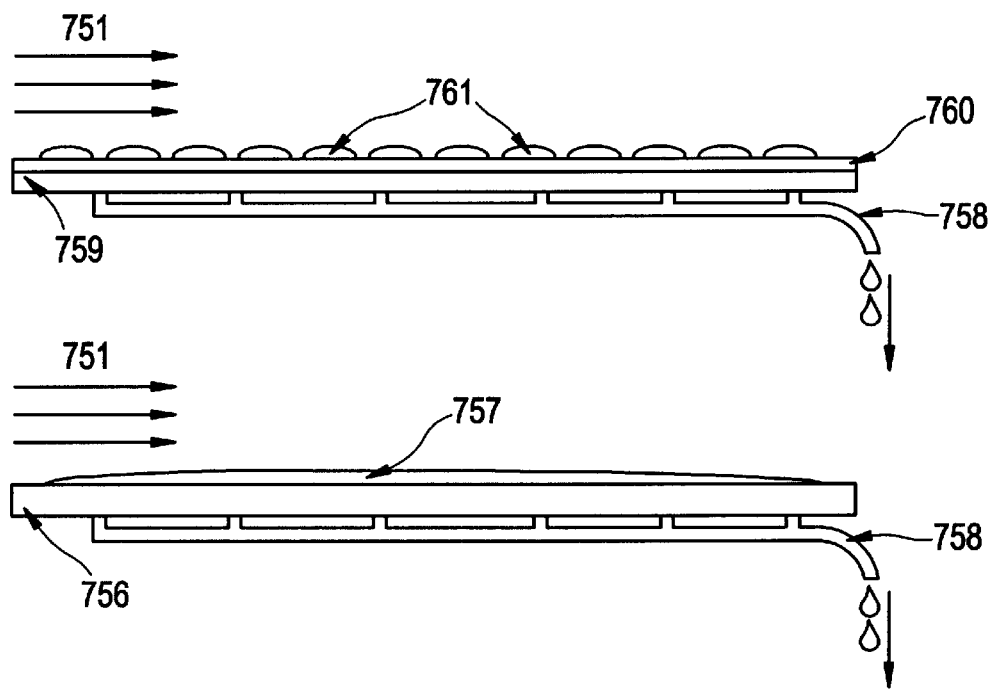
FIG. 2b presents a comparison between drop-wise condensation and film condensation of water vapor on a horizontal condensation surface.

In FIG. 2b, the horizontal condensation surface 756 is wet and smooth and hence the hot humid air 751 condensates as a thin film 757 and flows by gravity to water collector 758. In contrast, the horizontal condensation surface 759 is coated with a layer 760 that promotes drop-wise condensation and hence water vapor condensates from the hot humid air 751 as droplets 761 that drip by gravity to water collector 758.

The condensation surface 703 of the apparatus of FIG. 1 is flexible to expand as much as the space allows. In principle, the condensation of any large quantity of freshwater is possible, since the quantity of condensate that can be collected from the air at any time is proportionate to the quantity of moisture entrained in the air and the condensation surface area. However, the plate does not have to be constructed as one continuous surface. Connected segments or modular units can be used for production of large quantities of freshwater.

The formed condensate drips by gravity to accumulate freshwater where it can be collected, treated by appropriate disinfection and filtration methods, then distributed and supplied to consumers as potable water or freshwater.

Figure 3:
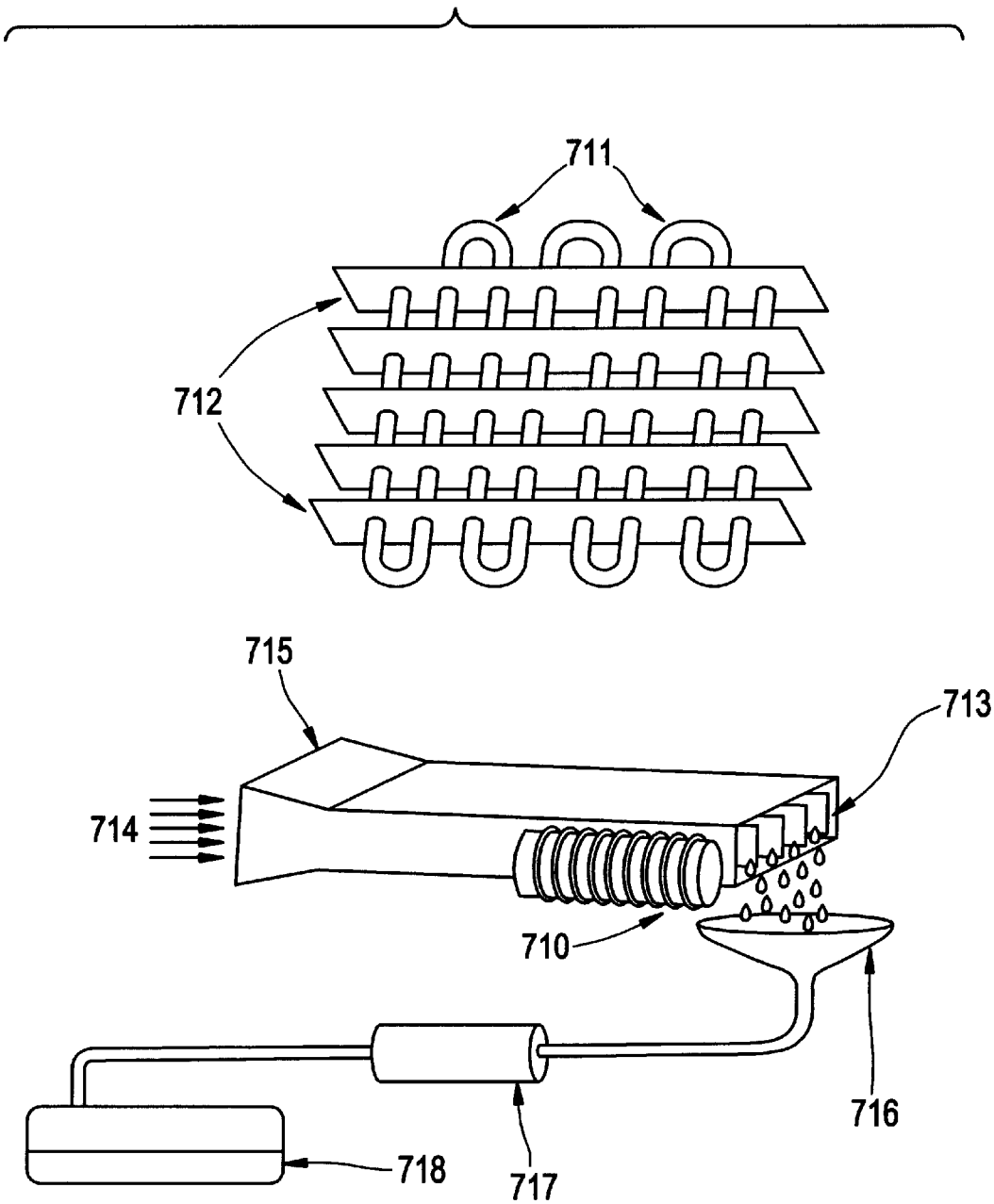
FIG. 3 displays the configuration of a device for extraction of water content in hot humid gas whether the gas is air, an exhaust gas from an internal combustion engine of a land vehicle or a seagoing boat, or a mixture of air and exhaust gas using a prism enclosed condensation surfaces cooled by a thermoacoustic refrigeration engine.

FIG. 3 shows a compact device for condensation of water vapor entrained in hot humid ambient air using a thermoacoustic engine 710 to cool freshwater flowing in cooling coils 711 that provide cooling to rigidly attached fins in the form of thin metallic plates 712. The fins 712 enhance the heat transfer between hot humid air and the cooling surfaces and act as condensating surfaces as well. The coils 711 with the joined fins 712 form a condensation unit contained in a two-section condensation chamber in the form of a funnel-shaped jacket 713. One section is formed from a short prism with trapezoid sides, a wide rectangular mouth as an inlet, and connected on the other side by a narrower rectangular outlet with the second section, which is a long rectangular parallelopiped. The jacket 713 draws hot humid air 714 at the wide mouth inlet 715 by a suction fan. The hot humid air moves through the two sections of the chamber passing by the condensation surfaces and leaves the narrow outlet of the jacket 713 free from atmospheric humidity while the condensate drips by gravity to a funnel collector 716. The open collector 716 will assist in removing any volatile organic particulates. The collected water is treated by the filtration unit 717 to remove suspended particulates. The product freshwater is then stored in a tank 718. Unit 717 may include a disinfection stage if potable water is required. However, in situations of emergency, simple filtration can be sufficient if the water intake is for a limited time only.

Figure 4:
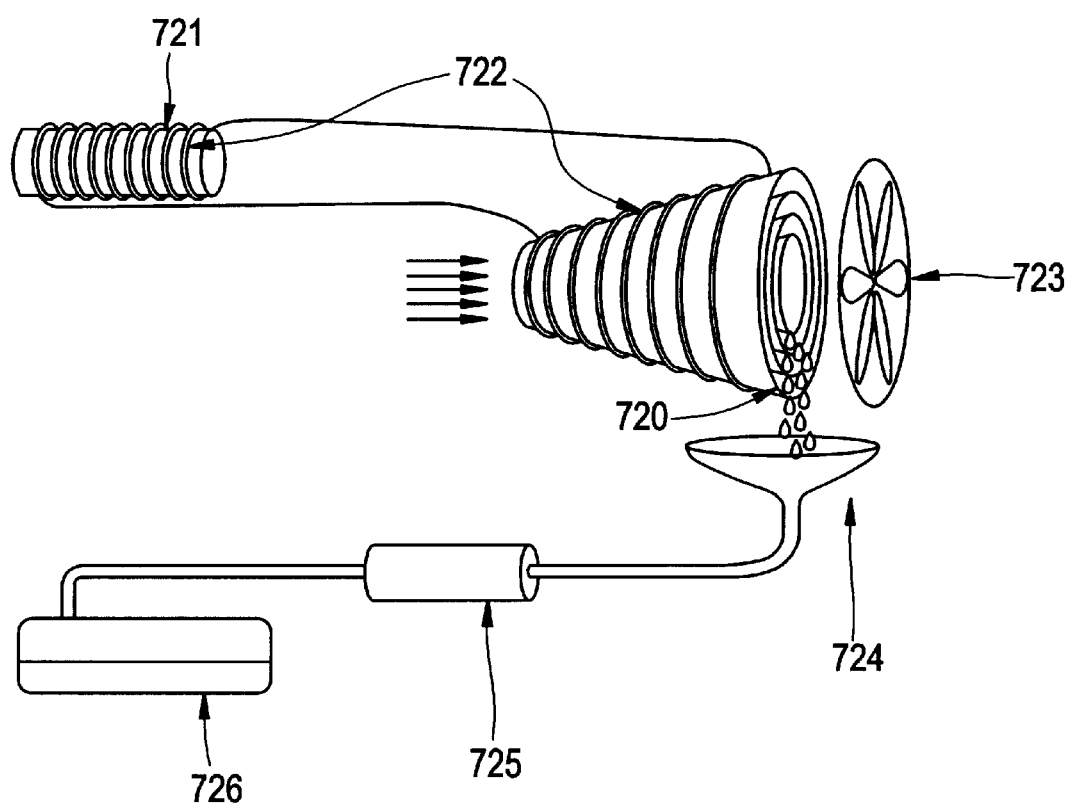
FIG. 4 shows a conical device similar to the device of FIG. 3.

In another embodiment, FIG. 4 shows the configuration of an apparatus for condensation of water vapor entrained in hot humid ambient air using conical condensating chamber 720 constructed from concentric metallic layers of condensation surfaces. A thermoacoustic engine 721 cools the water in the coil 722 that surrounds the conical condensating chamber 720. Hot humid air rushes at the narrower mouth of the cone 720 under the effect of a suction fan 723, that draws the hot humid air to the wider mouth outlet, leaving behind the water vapor that condensates on the condensating layers. The condensate drips down by gravity in the big mouth funnel collector 724. The collected water flows to a filtration unit 725 and then to a storage tank 726.

The components of the condensation devices of FIGS. 1, 3, and 4 are lightweight and small compared to any other devices of similar capacities, using other refrigeration cycles. Thermoacoustic engines have no fast rotating mechanical equipment. The device, however, has blowers and fans to drive the air over the condensation surfaces. When pumps are needed to drive the flow of water in large systems, only booster pumps are required. This makes the arrangements ideal for water production from moisture-laden gases. Examples are the water-vapor rich exhaust of automobiles, vans, trucks and boats or a combination of humid air and exhaust gases from internal combustion engines. The size of the devices can be made very small so that the condensating chambers can be fitted to the exhaust system of a vehicle to collect freshwater, providing appropriate filtration of the exhaust is used. Furthermore, reduction of the condensation surfaces and plates makes it possible to construct devices of limited capacity to provide a single person, two people or more with drinking water.

Figure 5:
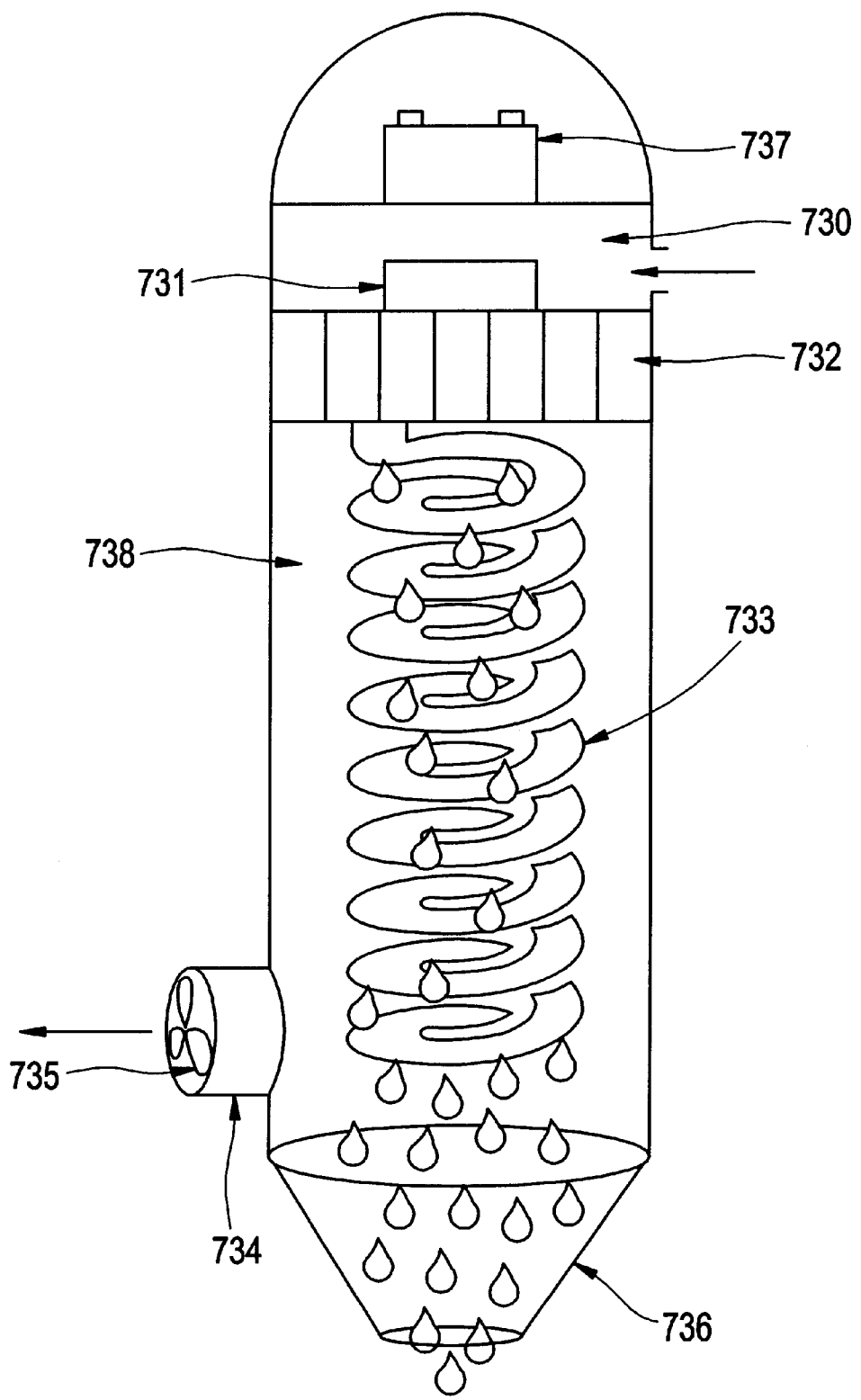
FIG. 5 shows a thermoelectric device for condensation of water vapor entrained in humid air or gas

The apparatus of FIG. 5 uses thermoelectric cooling in condensation of atmospheric humidity. Thermoelectric chillers and cooling devices are produced by Thermoelectric Cooling America Corp.™ (TECA), Chicago, Ill.; Melcor Corp.™, Trenton, N.J.; Tellurex Corp.™, Traverse City, Mich.; Farrar Scientific™, Raleigh, N.C.; Supercool U.S., Inc.™, San Rafael, Calif.; or any equivalent.

Hot humid ambient air enters from an inlet 730 by the action of a suction air fan 735 located at the outlet duct 734. The water pump 731 circulates the cooling water through a thermoelectric cooler 732. The cooling water circulates through the condensation spiral coils 733 to condensate the water vapor entrained in the hot humid ambient air as it passes in contact with the condensation surfaces. The coils may be fitted with thin fins to enhance heat exchange with the hot humid air. The condensate drips by gravity through the bottom of the apparatus after treatment and filtration by treatment unit 736. In case of supply of emergency water, no treatment is required other than filtration. The water production apparatus is powered by a bank of chargeable batteries 737.

Figure 6:
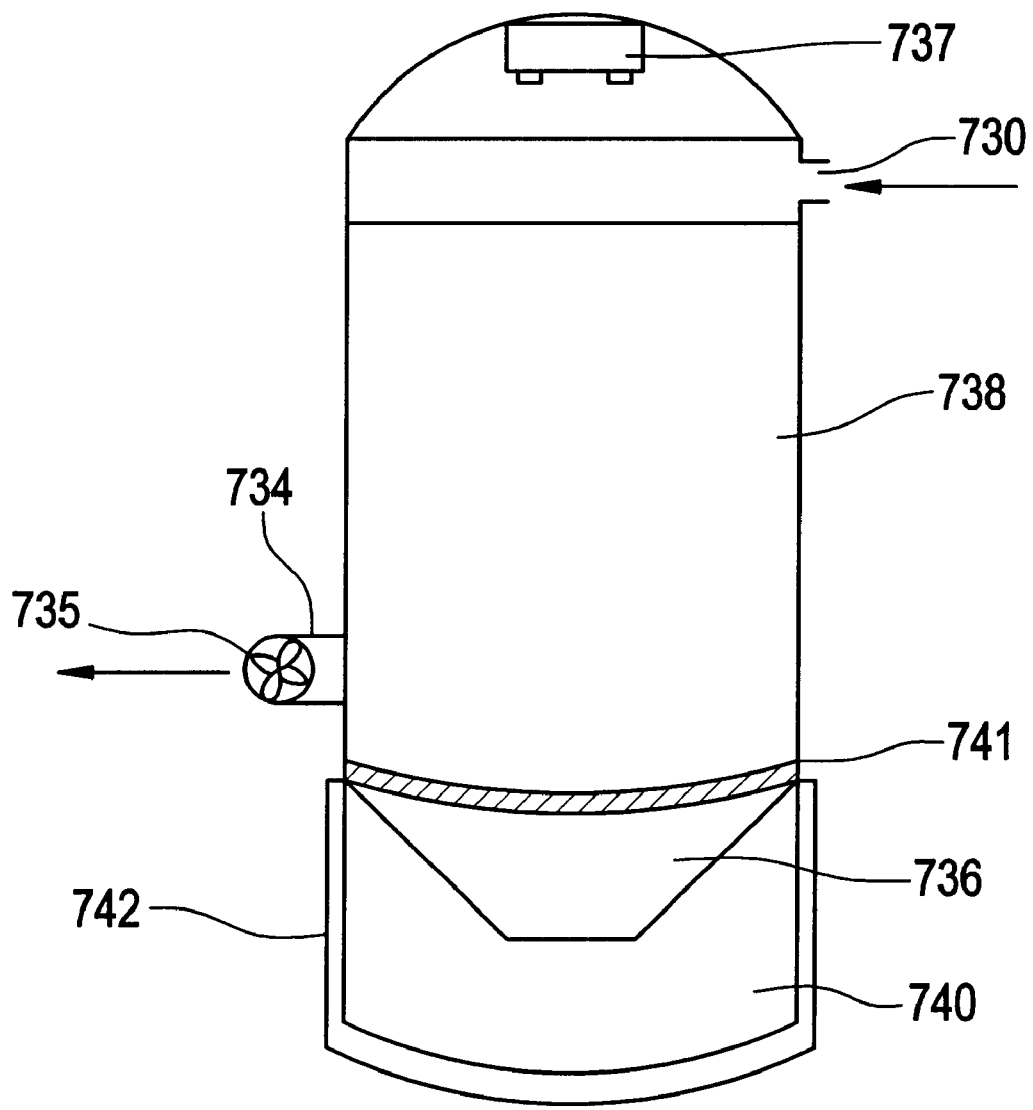
FIG. 6 shows a device similar to the device of FIG. 5 for supplying drinking water for one individual using water collected from humid air or gas.

All the components of the apparatus can be packed inside a relatively compact container 738. Accordingly, the apparatus can be constructed at a reduced size and capacity to provide potable water sufficient for the daily supply of one person as shown in FIG. 6, wherein the water production apparatus is attached to the top of a thermos, canteen or thermally insulated cup 740 which can be strapped to the apparatus with a belt 741. When the container 740 is filled, it can be released for use of the potable water or replaced by another. A spongy cloth can be used to wrap the container 740 to cool the water in the container by evaporative cooling.

The thermoelectric apparatus of FIGS. 5 and 6 are ideal for collecting water from the exhaust of internal combustion engines in case of an emergency, providing appropriate filtering of the exhaust moisture-laden gases is used to eliminate sod and organic and inorganic particulates.

Figure 7:
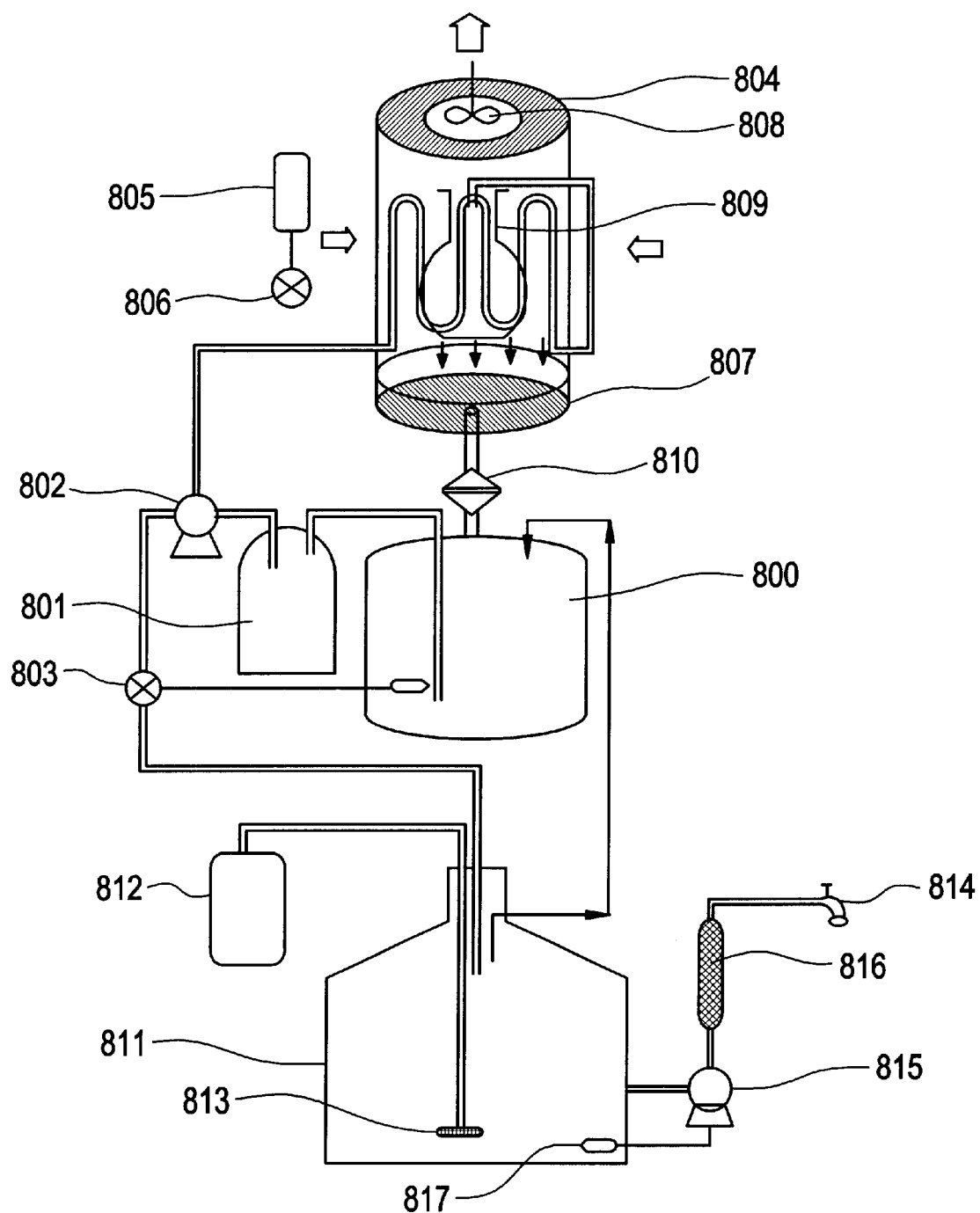
FIG. 7 presents the structure of a system for production of cold potable water from hot humid ambient air by condensation of water vapor entrained in hot humid air on surfaces cooled by freshwater combined with evaporative cooling.

The water production process of FIG. 7 starts with filling the thermally insulated collection tank 800 and the thermoelectric water cooler 801 with a priming charge of freshwater. The outside surface of the tank 800 is padded with thermal insulation material in a manner sufficient for the water inside to keep its cold temperature all the time. The thermoelectric water cooler 801 cools the cooling water of the condensation unit 804 to a few degrees below ambient temperature since the temperature of the condensation surfaces need to be maintained just below dew point of the air moisture.

In the implementation of this aspect of the patent, the stainless-steel water chiller 801 is a commercial water cooler manufactured by Canaletas S.A.™, Barcelona, Spain and modified by Advanced Thermoelectric Products™, Nashua, N.H., USA. Other drinking water coolers may be used; for example Koolatron™, Rochester, England UK, Pure Earth Technology™, Marietta, Ga., USA, or equivalent. In addition, coolers that use a conventional CFC cycle such as freon may be used, such as Oasis™, Columbus, Ohio, or Larco, Inc.™, Harrisville, N.H., USA; Sunroc Gas™, Maryland, USA, Tianjin Tahoe Cooler™, Tianjin, China, or any equivalent.

The condensation process does not start until the priming water charge is cooled in the cooler 801. At that time, water is drawn from the cooler 801 by a pumping unit 802 combining a plurality of a switch, valve, and water pump of appropriate capacity. The water valve 803 is actuated to direct the flow of the cold water to the coils of the cylindrical condensation unit 804 to condensate the incoming hot humid ambient air.

The water valve 803 allows water to flow either to the unit 804 or to the storage tank 811. When the temperature and relative humidity measured by the sensor 805 are such that the specific humidity drops under a level at which condensation of moisture from the air becomes uneconomical the interrupter 806 interrupts the power supply to stop the air fan 808. The signal from the sensor 805 opens the valve 803 to direct the flow to the storage tank 811, and switch the pumping unit 802 to pump water to the storage tank 811.

The air fan 808 draws hot humid air from the atmosphere from the sides of the unit 804 in the direction of the coils such that the incoming air loses its moisture by heat transfer with the cold fins and coils of unit 804. As the hot humid air gets cooler and drier, it moves up passing by the porous pot 809 located at the center of the coils in its way to the air outlet of the unit 804.

The cold water driven by the pump 802 and flowing through the coils of unit 804 terminates into the porous pot 809 through its open mouth as relatively warmer water. The pot is a specially shaped and fabricated from porous non-glazed baked clay or ceramics. Ceramic pots are preferred for their durability. The porosity of the pot induces evaporative cooling of the water contained inside, as it flows through the pot, by the drier air flowing upward. Evaporative cooling reduces power consumption (in terms of kWh per liter of produced freshwater) in the cooling process that adjusts the temperature of the cooling water.

The dripping of condensate from the coils of unit 804 and pot 809 as well as the water from the pot drain to the bottom of unit 807 and fall by gravity to a preliminary filter 810 down to the collection tank 800. Accumulated cold water in the tank 800 flows to the cooler 801, or can flow directly to the storage tank 811 through valve 803.

The preliminary filter 810 removes any suspended dust, fine sand or suspended particulates. The filter 810 is a column combining active carbon and ion exchange resin. In the implementation of this aspect of the invention, a Britta™ filter, or equivalent may be used. This type of filter is commonly used at home for tap water purification for drinking and use in preparation of food and drinks. Among the commercial filters that can be used are those produced by Omni™, Pûr™, and Rubber Maid™, USA.

In special cases wherein ultrapure water is needed two ion exchange columns may be used one for cation-exchange and another for anion exchange to eliminate negative as well as positive ions. The length of the residence time in the filtration unit is such that the water will have enough time for effective filtration.

The water in the storage tank 811 is disinfected by ozonation to oxidize microorganisms. The ozonation is most effective in cold water and a small quantity of ozone will be required for disinfection. The ozone generator 812 feeds ozone to the tank 811 through the stone outlet 813 that releases and distributes ozone throughout the stored water.

Ozone generators and ozonators of different capacities are commercially available and can be customized to the application according to specifications. Ozonators are produced by Ozomax™, Montreal, Quebec, Canada; Water Ozonator™, Sota Instruments™, British Columbia, Canada; and Ozoteck™, Yreka, Calif., USA, or any equivalent. Active carbon filters are produced by Rubbermaid™, Cameron Carbon, Inc., Baltimore, Md.; or Hermotz™ filter, Plymouth, Minn., USA or any equivalent.

Drinking water is dispensed through the faucet 814 which actuates an on-demand pump 815 that pumps water from the storage tank 811 through an activated carbon filter 816 to remove suspended particulates, contaminants and oxidized waste from the ozonation process; from the water before use. To avoid cavitation of the pump 815, a float sensor 817 is used to interrupt the dispensing operation when the tank 811 is empty or below a certain level by shutting off the pump 815 and the ozone generator 812.

The length of the residence time in the disinfection and filtration processes is such that the water will have enough residence time in the units for effective disinfection and filtration.

The pump 815 is manufactured by SureFlO™, Browly, West Sussex, UK or any equivalent. When all faucets are locked and no drinking water is drawn, the pressure in the system rises and the pump 815 stops. This feature increases the lifetime of the pump and stretches its use. The pump 815 operates on twelve volt and continuous current and hence it is connected to a current transformer to step down the voltage from 110 Volt or 220 Volt continuous current to 12 Volt continuous current. The transformer is supplied by Bicron Electronics™ or any equivalent. At the start of operation 10 amperes are needed, however as the operation starts, only 6 volts are required for operation. It is necessary to stop the pump 815 when the tank 811 is empty, otherwise the pump 815 will continue operating at no load until enough water fills the tank 811 which may take long time if the ambient air is mild and has low humidity. Stopping the pump at that time will reduce power consumption and increases the useful life of the pump.

Since the condensate collected from the atmosphere is free from useful minerals and has characteristics similar to distilled water in purity and tendency to react with the surfaces of water passages, mineral addition may be necessary to provide the nutrition value of natural water and to prevent chemical reactions with the containers.

In subsequent operations of the system, the priming charge is not necessary and water from the storage tank 811 can be pumped back to the collecting tank 800. This is needed when the weather changes, and the condensation process is stopped and the cooler 801 is depleted of water.

Figure 8:
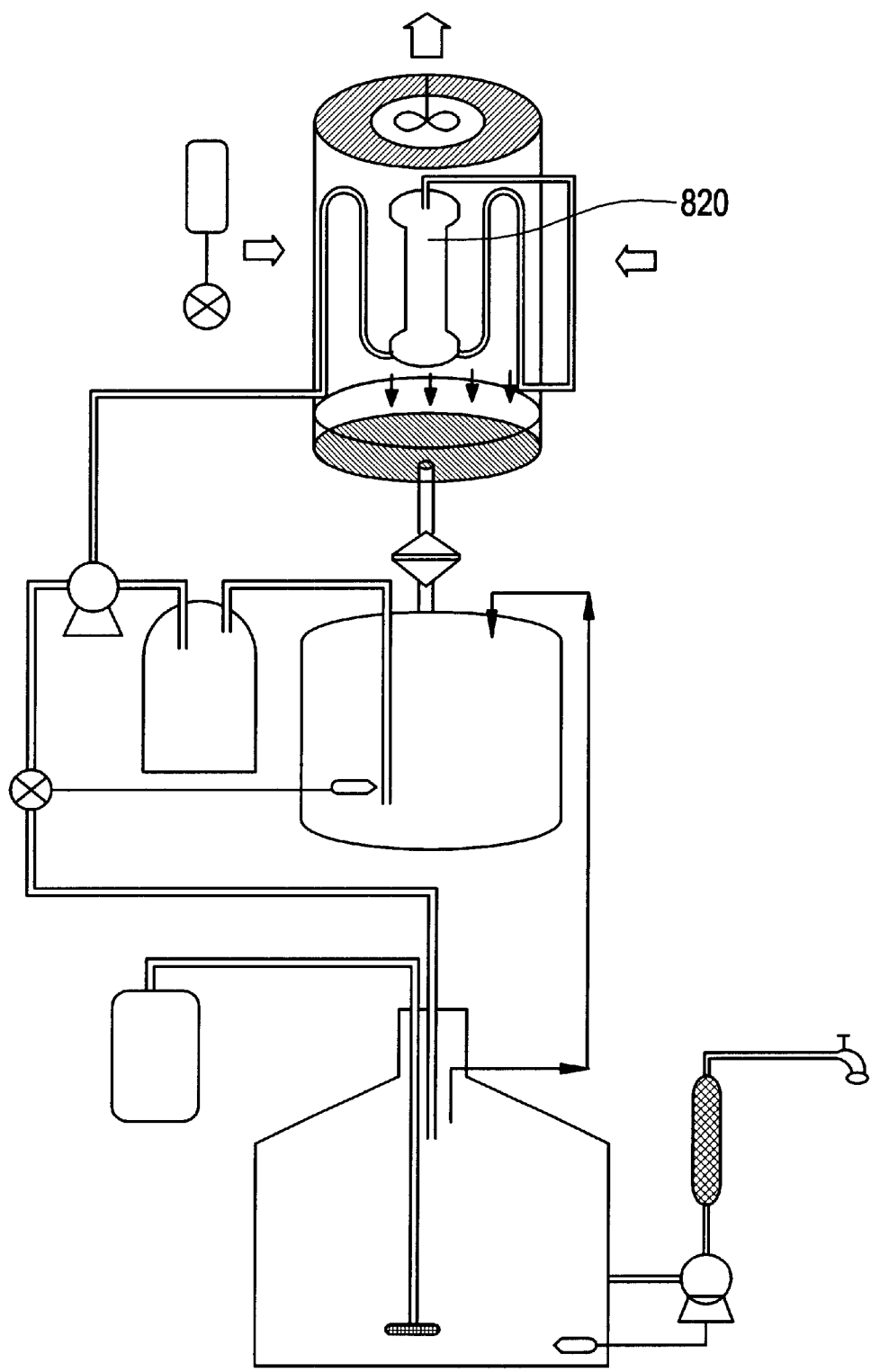
FIG. 8 shows a modification of the system of FIG. 7, using evaporative cooling tower.

The pot 809 may be replaced by a small cooling water tower 820 as shown in FIG. 8. The water tower 820 may be constructed from porous non-glazed baked clay or ceramics to provide additional evaporation surface to further cool the warm water leaving the cooling coils if unit 804. Alternately, construction of the water tower 820 from galvanized metal will provide cooling by convection. Use of plastics will provide cooling by evaporation as well as convection. However, porous ceramics would provide the most cooling.

Figure 9:
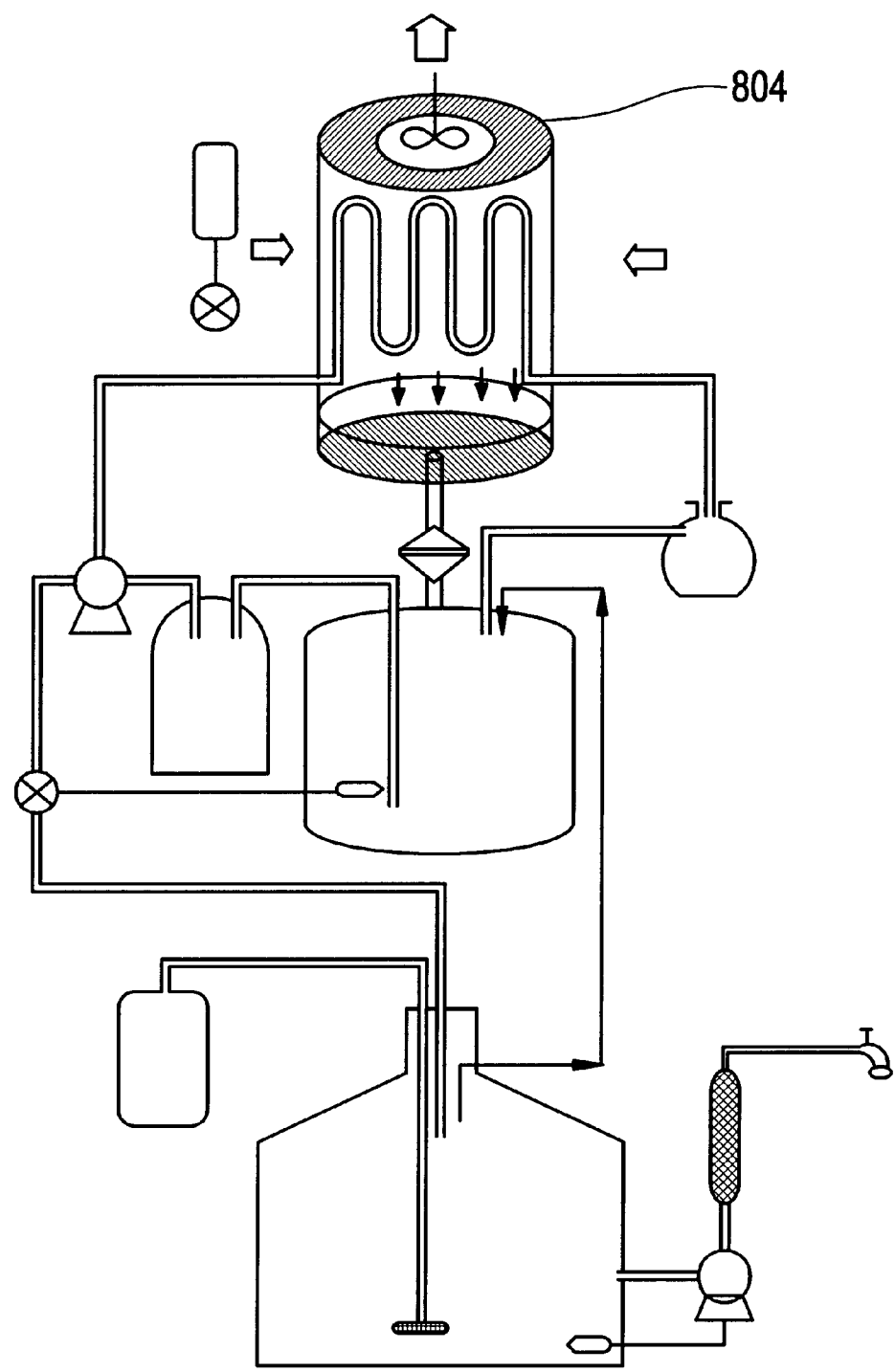
FIG. 9 shows a modification of the system of FIG. 7, using an evaporative cooling pot located outside the cylindrical condensation configuration.

Alternately the pot 809 may be located outside the unit 804 as shown in FIG. 9. This will allow dry air to freely flow outside the system. In that case, the relatively cool air may be directed to cool a closed space such as the interior of a tent or cabin.

Figure 10:
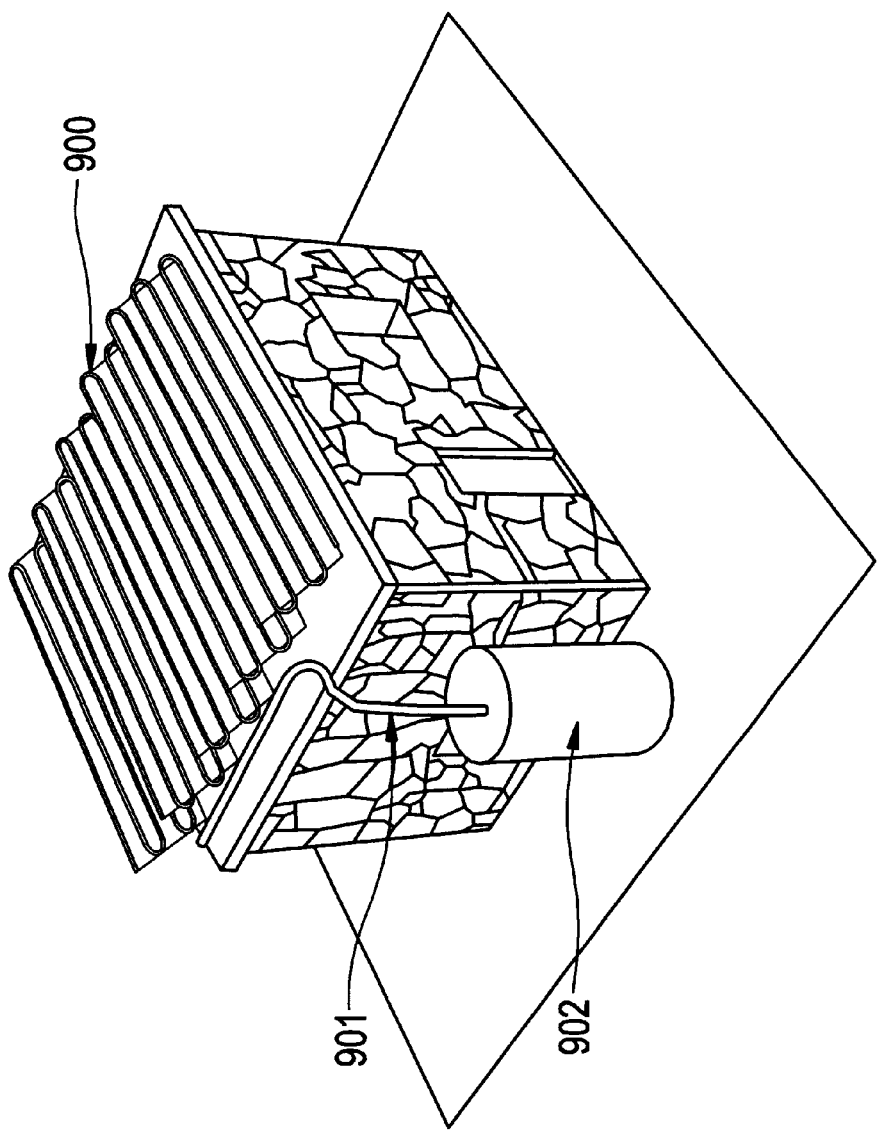
FIG. 10 shows a configuration of a system of corrugated cold surfaces for condensation of humidity from hot humid atmosphere, wherein condensation surfaces are installed on the roof of a building in a manner that allows flow and distribution of freshwater and provision of a protective cooling shield for the building.

In FIG. 10, a system is provided for production of water from atmospheric humidity appropriate for integration with the architecture of the structure of a building such as a small commercial building, a residence or home. The roof of the building is covered with a layer of corrugated condensation sheets 900 tilted to one sides of the roof to allow runoff of condensate. The condensation sheets 900 are made of sections of rough surfaced conductive non-corrosive material and can be placed on a flat top roof if it is supported in a manner that provides a steep slope on one side or on both sides as used in ranch-style homes. The condensation sheets 900 are cooled by cold water circulating in tubes attached to the bottom.

The corrugated structure provides grooves for condensate collection, and is connected to troughs and gutters that drain into one pipe 901 that pours the collected water in a tank 902 by a sidewall of the house. The pipe 901 can also be directed to a tank inside the house. Alternatively, the water can be pumped from the tank 902 to a storage tank over the roof of the house.

Hot humid ambient air flows by natural convection carried by prevailing winds. Orientation of the roof in a manner that allows the sweeping air to move from the low side to the top of the condensation surface structure would provide longer residence time and closer contact between the air and the surfaces. As air contacts the cold surfaces, water vapor is condensated on the surfaces and the condensate is slowly drained through the gutters. The maximum freshwater production will be the highest during early mornings and throughout high humidity nights. The high temperature of the direct sun radiation will heat the surfaces in the middle of the day and very little of water vapor will be condensated if any at all, since any condensate will be immediately evaporated and lifted by the passing air unless the air in the vicinity of the roof reaches saturation. Nevertheless, a quantity of water will be collected during hours of low solar radiation, especially during the night wherein nocturnal cooling takes place and the surface radiates to the open sky. The quantity of freshwater produced depends on the extent of the condensation surface, the surface area of the roof and the average absolute humidity present in the air.

To enhance nocturnal cooling, a shallow water basin may be constructed under the condensation roof. In addition, the condensation sheets may be constructed from plastic impregnated with conductive copper chips or from porous light color ceramic shingles. The water basin can be a source of hot water during the day if freshwater is circulated in the basin.

Sufficient freshwater can be produced by cooling the condensation surfaces with cold brackish ground water, if available. In this case, cold water is pumped to a plurality of coils connected to the bottom of the condensation sheets 900.

A high flow of product freshwater can be achieved using a thermoacoustic refrigeration engine to cool freshwater for circulation in pipes and coils connected to the condensation layers 900. Cooling the surfaces just a few degrees under the dew point will continuously condensate the water on the cold surfaces and the water will be drained fast enough before evaporation which does not easily occur in high humidity environment regardless of the rise in atmospheric temperature.

Thermoelectric refrigeration may also be used to supply coolness to the condensation surfaces, however the effectiveness will depend on the size of structure to be cooled. While thermoelectric refrigeration is ideal for small configurations, thermoacoustic refrigeration is preferred for large systems.

The tank 902 can be constructed as a water unit for supply of potable water by providing a water treatment facility for disinfection and filtration and dispensation of the drinking water. Disinfection can be achieved by ultraviolet radiation if the amount of production is limited otherwise chlorination and ozonation are preferred for the water stored in the tank. Filtration can be done when dispensing of the potable water. In addition, a pre-filtration stage may be useful for the water before it reaches the tank 902 and can be attached to the end of the spout of the pipe 901.

Figure 11A:
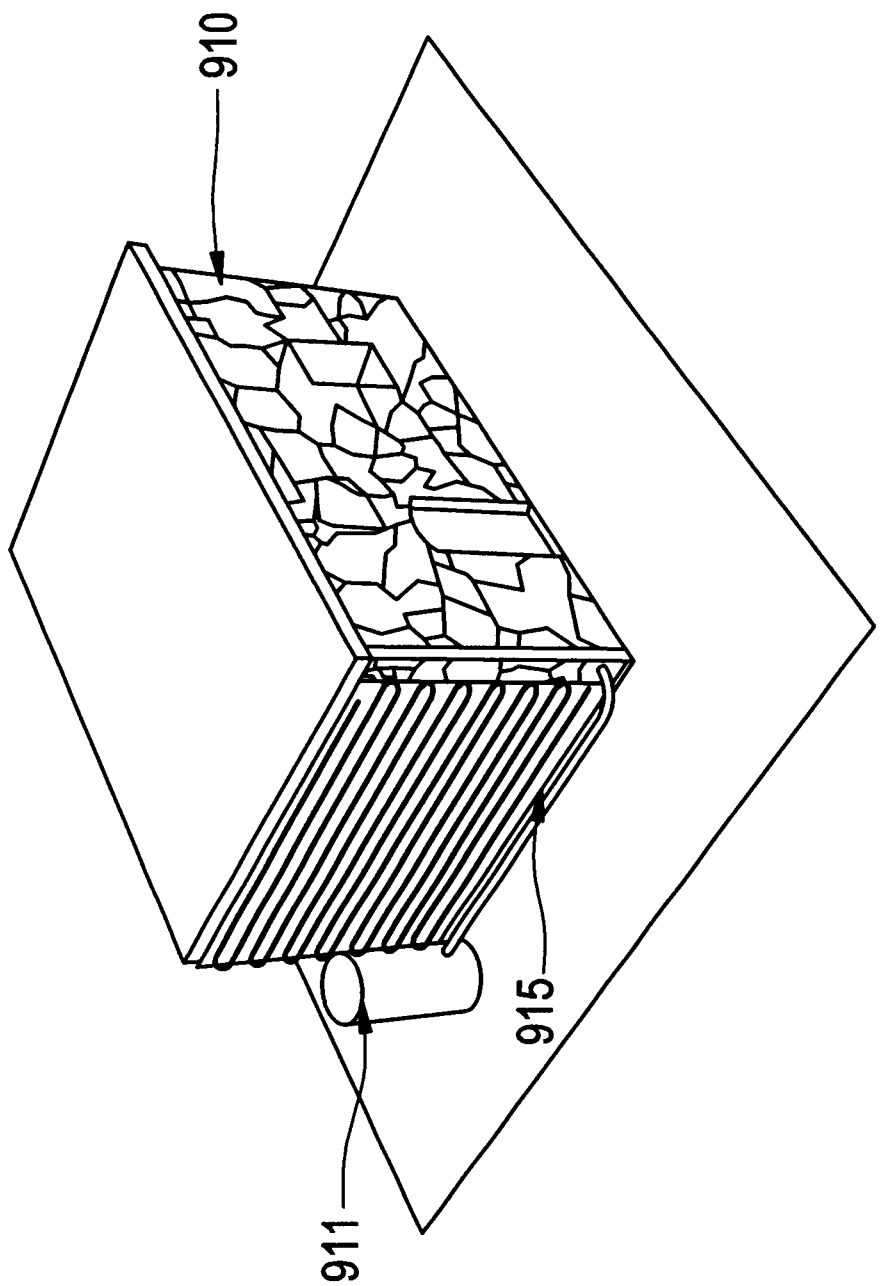
FIG. 11a shows a configuration of a system of corrugated cold surfaces for condensation of humidity from hot humid atmosphere, wherein condensation surfaces are installed on the sides of a building in a manner that allows flow and distribution of freshwater and provision of a protective cooling shield for the building.

An alternate implementation of the invention is shown in FIG. 11a, wherein vertical condensation sheets 910 cover the external walls of the building unit with cooling water pipes distributed between the wall and the condensation sheets 910. The condensate from water vapor accumulates in the water unit 911 and then is treated and supplied to the resident by the distribution unit 915. The surfaces have to accommodate for openings in the structure, such as windows and doors and become an integral part of the architecture.

Figure 11B:
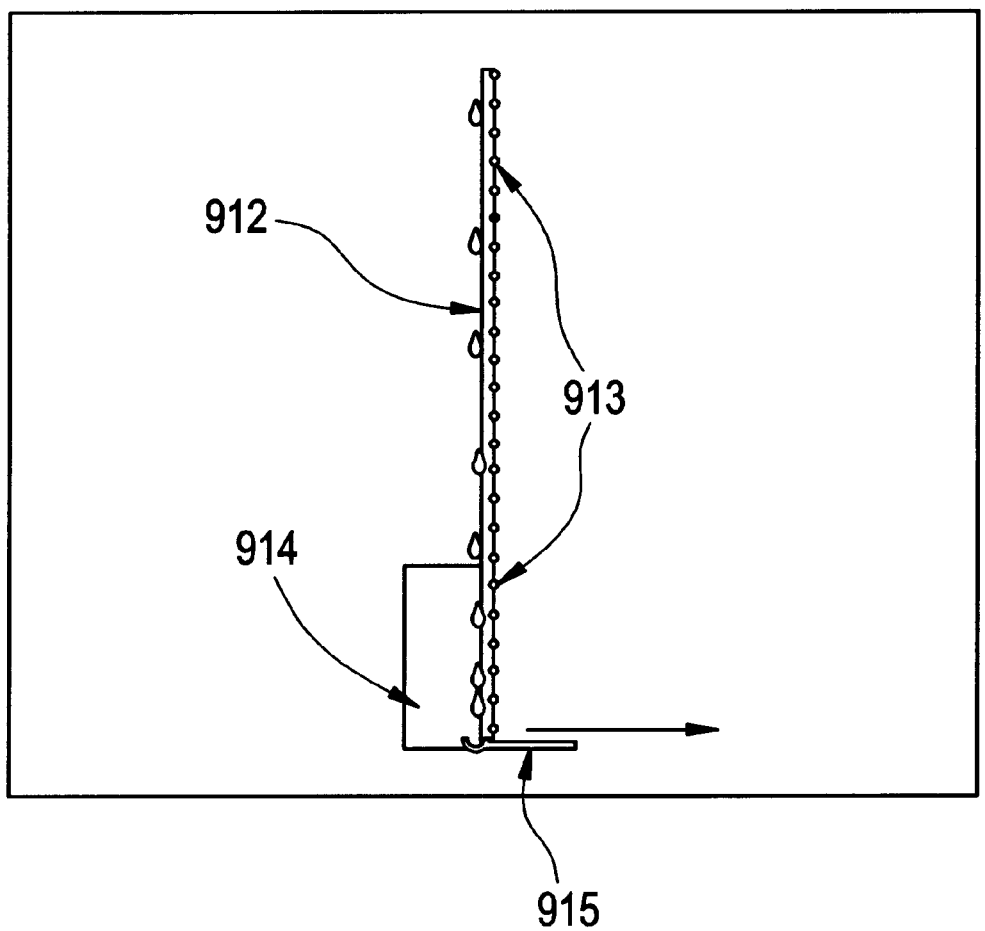

The components for the water preparation components are shown in FIG. 11b that include condensation surfaces 912, cold-water coils 913, the water treatment unit 914 and the distribution unit 915.

The sidewall arrangement is preferred over roof top condensation due to the ability to avoid direct solar radiation all day around to all the condensation surfaces. However, proper orientation of the surfaces to minimize the solar radiation flux is only possible in new housing construction. The coolness of the condensation surfaces is provided in the same manner as in the case of the roof structure.

The arrangement of sidewall condensation of FIG. 11 and roof condensation of FIG. 10 collection can be combined to provide high rate of freshwater production. The exact arrangement of the combined structure will vary according to the requirements of the owner of the building and the architecture's creativity. In the combined architecture the assemblage of the condensation surface can provide aesthetic effects as well as coolness inside the building.

Figure 12:
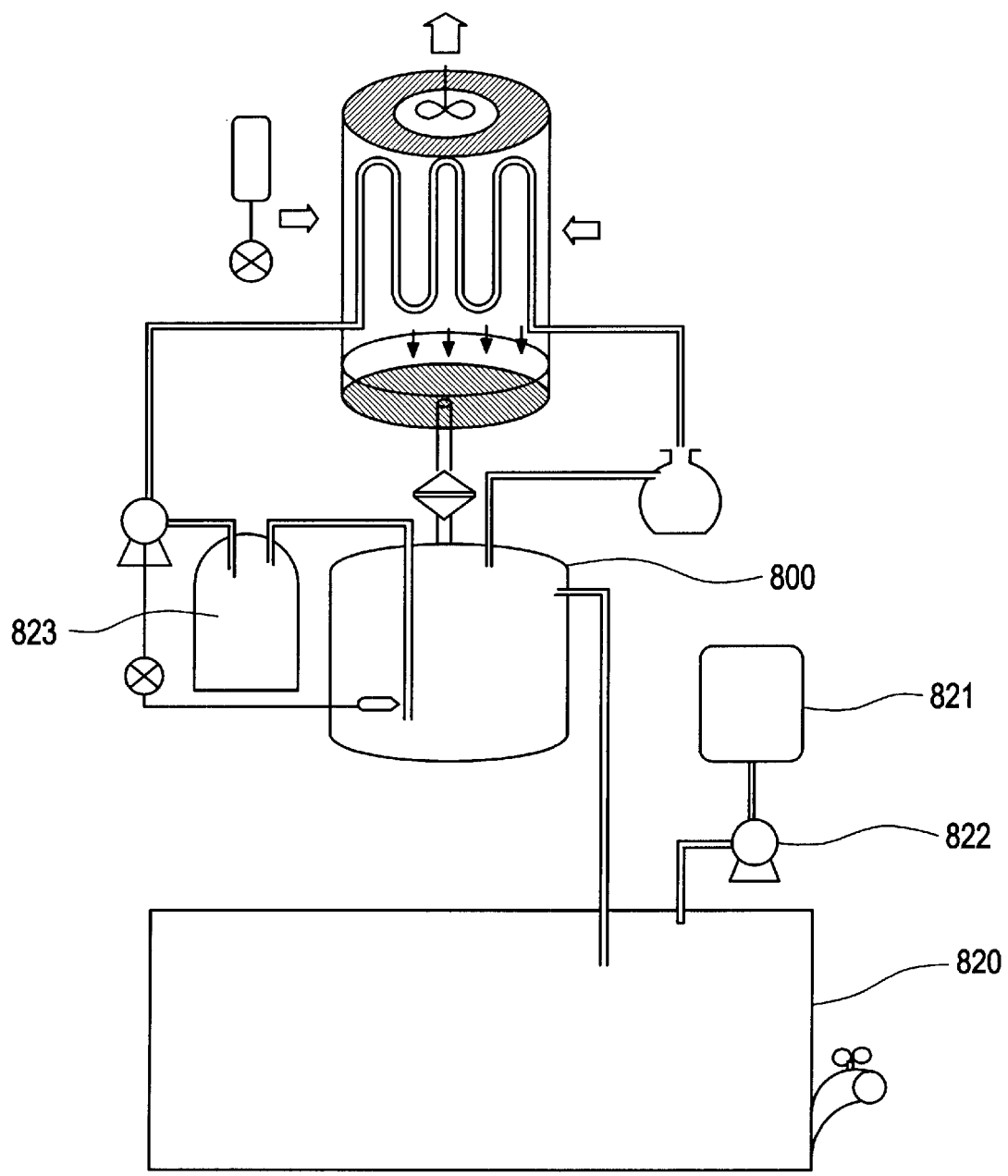
FIG. 12 shows the configuration of a system for production and distribution of fresh water for animal and fowl farms, based on the system of FIG. 9.

The system of FIG. 12 includes an adaptation and modification of the water production unit of FIG. 9 for providing drinking water for grazing animals, and animal and poultry farms. Most treatment and cooling components are eliminated and a large tank 820 with dispensation capabilities is added to provide ample supply of water when the need rises with climatic changes such as rise in ambient temperature.

In FIG. 12, a provision is also provided for adding nutritional material to the water supply from a hopper 821 to be dispensed by a dosing pump 822.

The function of the cooler 823 is limited to chilling the cooling water for condensation to maintain the temperature of the condensation surfaces below the dew point. The insulated tank 800 and the pot 809 will assist in maintenance of cold temperature of the cooling water. Depending on the capacity of the system, the cooler 823 can be cooled by thermoacoustic or thermoelectric refrigeration. Furthermore, the cooler 823 can be replaced by a large porous ceramic jar and other means to promote cooling by evaporative, perspiration or transpiration cooling. Alternately the system can utilize cold ground water if available as cold brackish water.

Furthermore, the system of FIG. 12 can be implemented to provide freshwater for irrigation providing the system relies completely on evaporation cooling or on cold brackish ground water to be cost effective in collecting water from the atmosphere. This will depend on the climate conditions in the area to be cultivated and the water requirements for irrigation.

In this case, easy to dissolve fertilizers or plant nutrients can be mixed with the produced freshwater.

Furthermore, wind energy or solar energy can be used in supplying power for operation of the system, if used for irrigation, in place of expensive electric power that may not be easily accessed in the region of implementation, which may be deprived of water and power resources. The use of such alternative energy sources depends on the solar insolation and the frequency and speed of the prevailing wind in the region. The system can operate continuously day and night without the consumption of much power. Furthermore, the coolness can be stored in rocks for use in cooling of the condensation surfaces.

Figure 13:
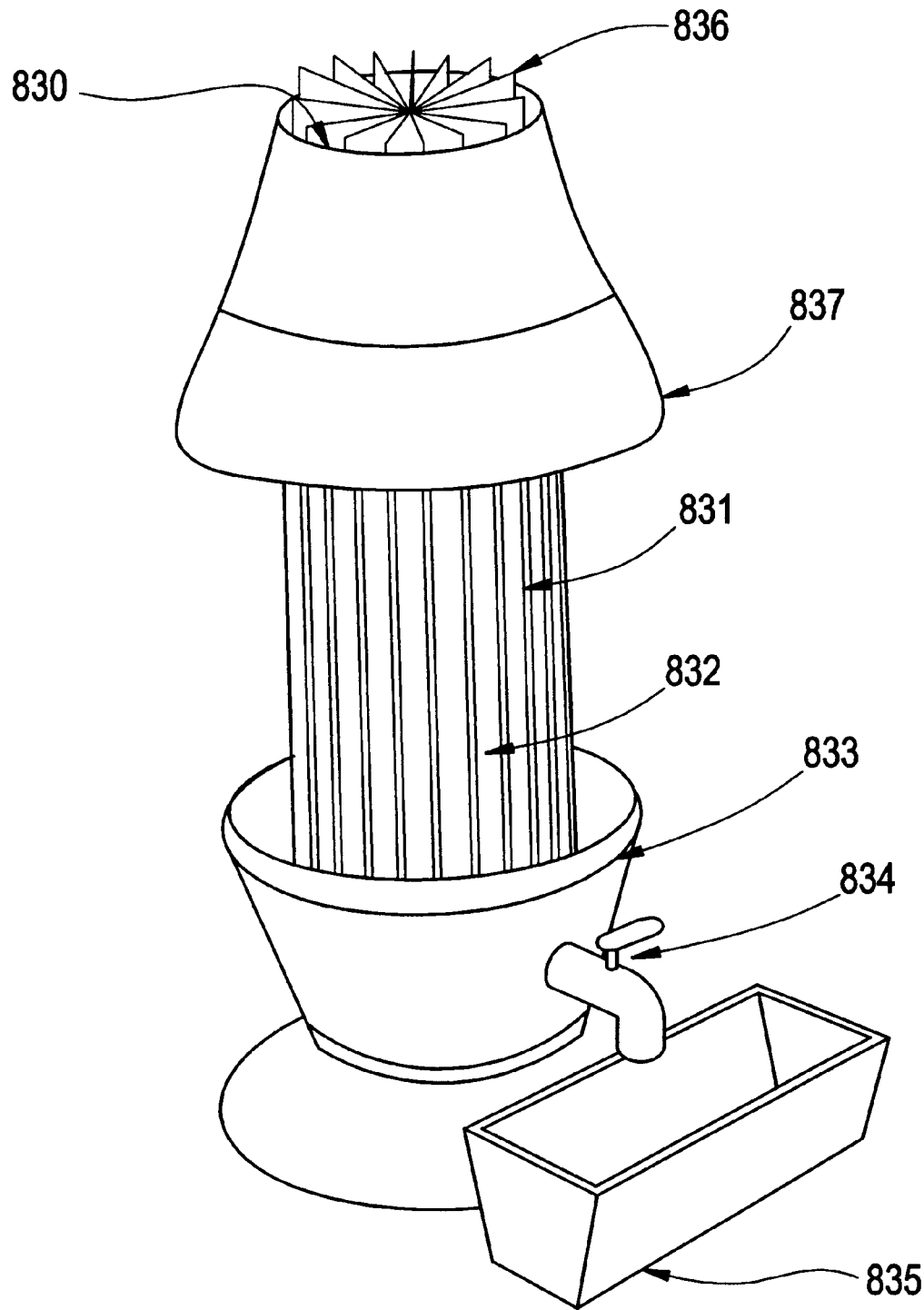
FIG. 13 shows a system for production and distribution of fresh water from hot humid air for animal and fowl farms, using thermoacoustic cooling for water vapor condensation surfaces.

The system shown in FIG. 13 is designed for providing drinking water for animals and poultry, wherein the thermoacoustic cooler 830 produces chilled water that circulates in cold water pipes 831 to cool the finned surfaces of a condensation cylinder 832. The condensate accumulates on the fins and drops by gravity to a container 833 where the drinking water is dispensed by the spout 834 to the drinking basin 835. The hot humid air is blown by the air fan 836 close to the fins of the condensation cylinder 832. The top cover 837 is provided to protect the chilled water pipes 831 from the direct sun radiation during the day and to help in directing the stream of hot humid air through in contact with the condensation surfaces 832.

Nutrients and medicinal chemicals can be added to the container 833 or to the basin 835 in doses proportionate to the water consumption rate. The system is of modular nature and can be constructed in different locations in a poultry farm. Alternately water can be produced at main locations and distributed to basins for providing drinking water to small groups of chicken or to stalls for use by animals. The drinking system can be integrated into the structure of a poultry farm or a barn in a manner compatible with the layout.

Figure 14:
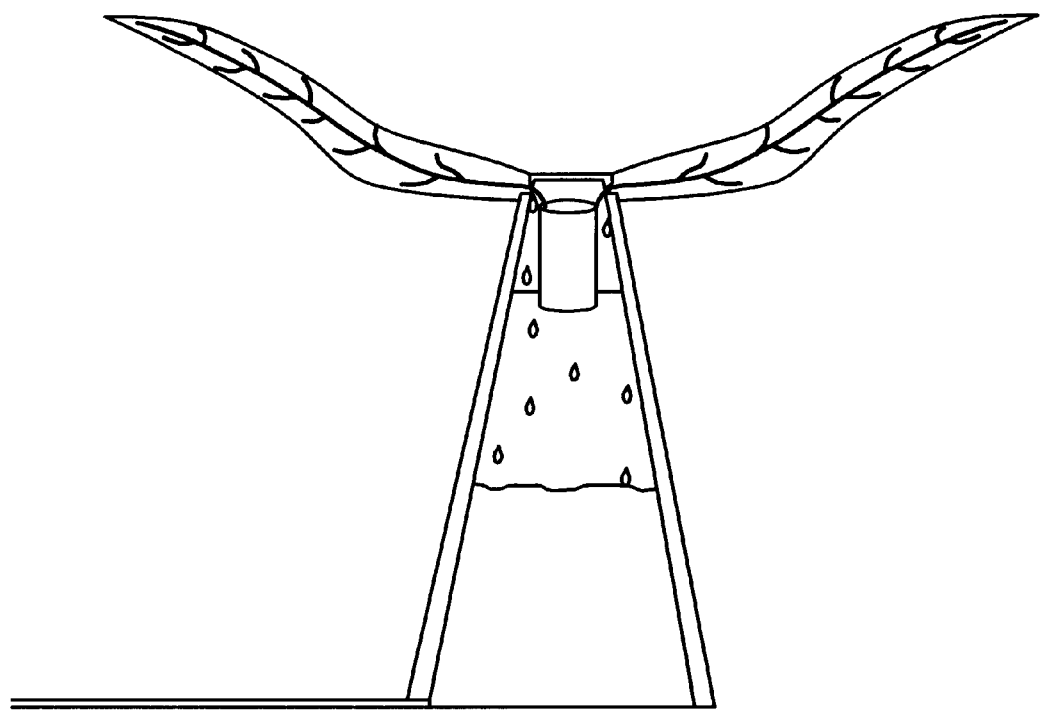
FIG. 14 shows a system for production and distribution of freshwater from hot humid air for irrigation, using thermoacoustic cooling for water vapor condensation surfaces.

For watering of trees using water from atmospheric humidity, the system of FIG. 14 is specially provided to assure efficiency in the use of irrigation water and to provide aesthetic appeal. The system is constructed to blend with natural trees growing within the vicinity of the water supply system and hence is shaped in the form of an artificial man-made vascular tree and is manufactured from wood. A hollow tree trunk may be used as the main component. The artificial trunk is covered with bark from natural trees.

The system is formed by wide leaflike condensation surfaces 851; running through it cooled branching tubes 852 similar to leaf vessels. The condensation surface 851 is designed to expose the surfaces to the hot humid air stream for condensation of the water vapor entrained in the hot humid ambient air. The water-cooling unit 853 is placed at the top of the treelike trunk to supply cold water to the condensation surfaces 851. The condensate falls by gravity and accumulates at the bottom part of the trunk in a tank 854 or at the distribution point 855. Fertilizers can be added to the water in the tank 854 or at the point of distribution 855, which feeds a distribution system that supplies water to the roots of the trees around. The extent of piping and the number of trees to be watered by one system depends on the water requirements of the specific trees and the quantity of water that can be condensated in each unit.

Figure 15A:
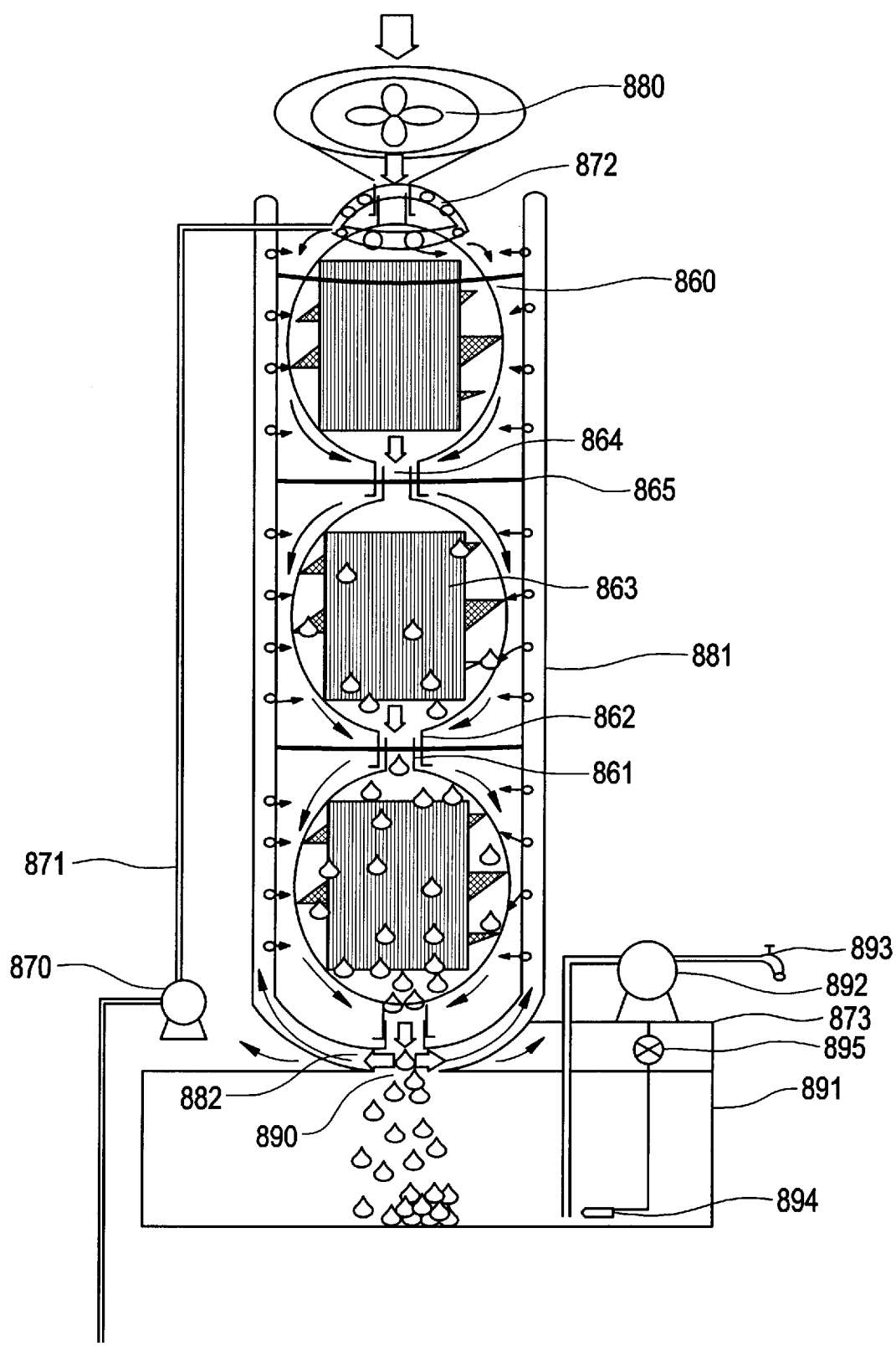
FIG. 15a shows a system for production of fresh water from hot humid air for irrigation or supply of drinking water aboard ships, using evaporation cooling of salty water.

FIG. 15a shows the components of a modular system using a combination of natural convection water-cooling, transpiration cooling and evaporative cooling for harvesting water from atmospheric humidity. The system is suitable for seashore regions and areas with abundant underground water resources that provide relatively cold brackish water or water containing high dissolved solids contents and not suitable for drinking. Simpler versions of the system are appropriate for production of potable water on seagoing vessels or small islands in the middle of the sea.

Each condensation module or stage 860 is in the form of a pot with two differently shaped necks. A narrow neck 861 of one pot can tightly fit into the opening of the wider neck 862 of another to form a stack of pots. The two necks can be locked into each other.

In one embodiment, the pot is fabricated from a porous ceramic material, while the interior wall is covered with a thin metallic layer. The pot can be also fabricated from metal for durability with a layer of porous material covering the outer surface. The pot is coated by a material that can absorb water and to the saturation level, such as padded cotton, wool, sponge, corrugated cellulose or natural animal skin (untreated leather) with a surface of thick hair. Inside each container, there is a set of coils and metallic condensation surfaces 863 with fins to promote heat exchange between the hot humid air and the cooled condensation surfaces.

Figure 15B:
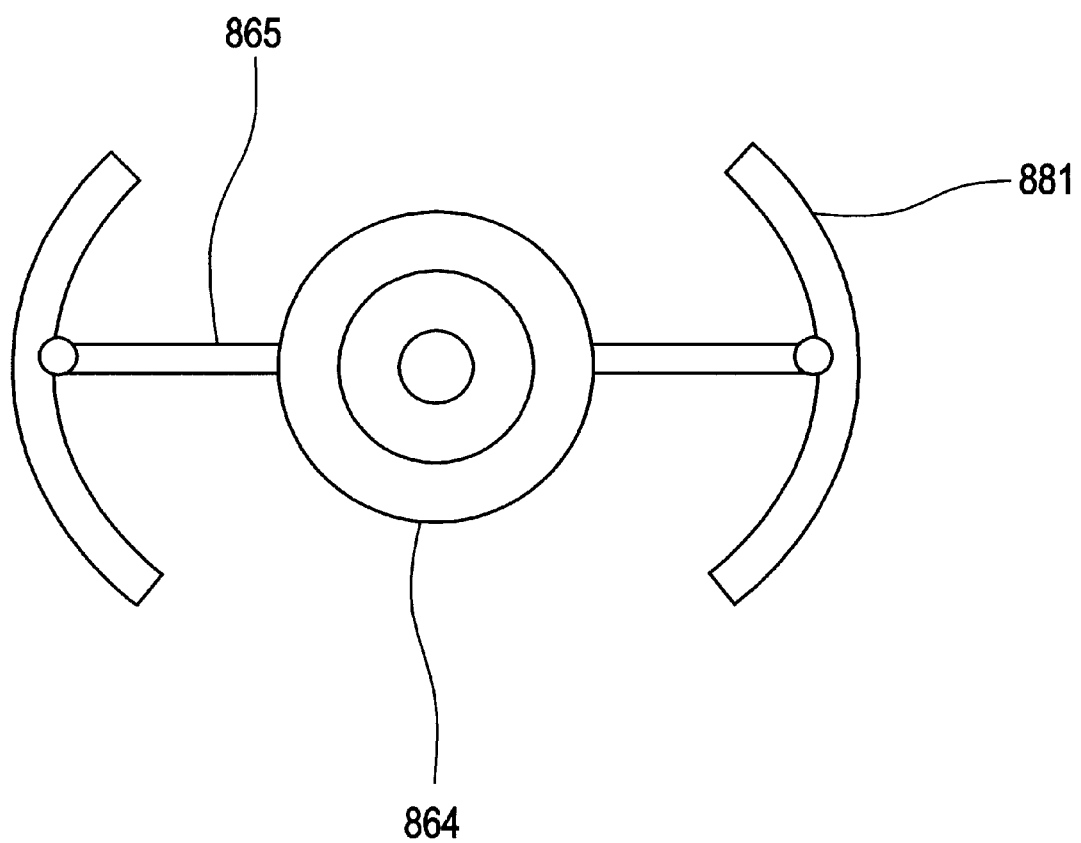
Figure 15C:
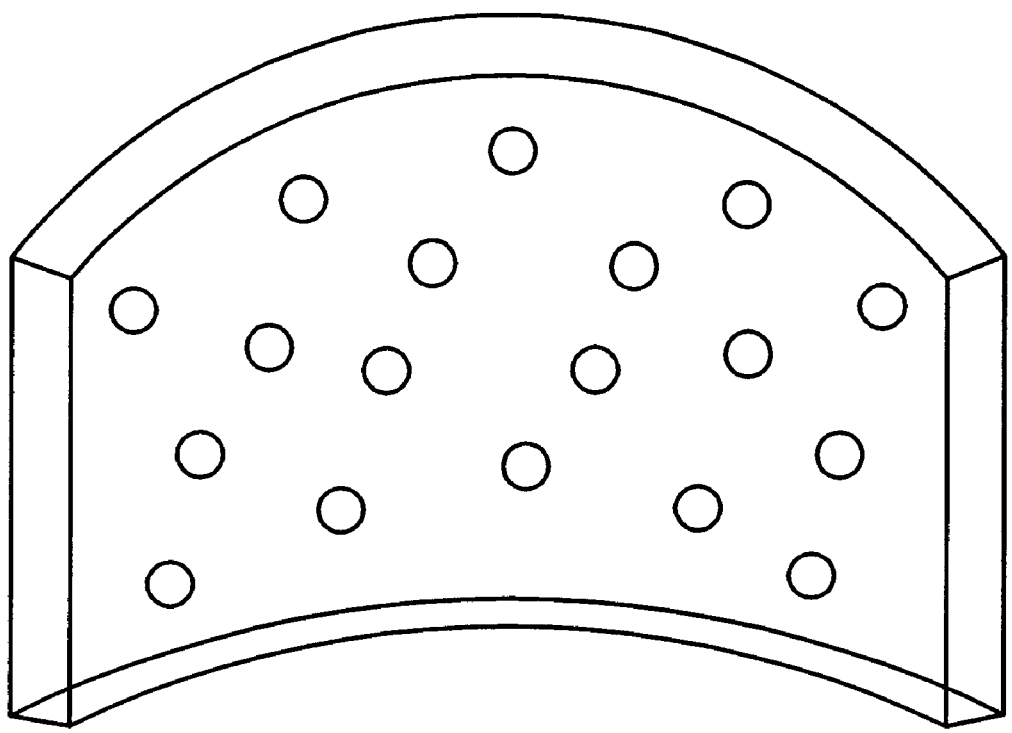

After locking each pair of pots, the necks are tied up with a strong choker 864 that can be fabricated from leather or metal, strapped by a strap 865 connected to an air radiator 881 that surrounds the stacked pot assembly, as shown in FIG. 15b. The air radiator is constructed from a hollow cylinder with wide orifices to allow the flow of air from inside to outside, as shown in FIG. 15c.

The operation of the system involves drawing brackish water from a natural water source using the pump 870 that pumps the water into the pipe 871 and sprays it over the outer skin of the pots with the sprayer 872 to dampen the porous surface and the coating to saturation. The sprayed water falls by gravity to the disposal basin 873 where it can return to the open sea or to the well.

Upon saturation of the porous surfaces with water, the water evaporates by heat transfer between the relatively dry air surrounding the outer surfaces of the pots resulting in cooling of the interior of the pots 860 as well as the condensation surfaces and fins 863. The hot humid air is blown inside the pot assembly by the air blower 880 located at the top of the assembly. The water vapor entrained in the hot humid air condensates as it strikes the cold fins 863. This process takes place in stages, as the hot air enters and gets cooler and dryer, the colder air, flows down the assembly. At the pot in the bottom of the assembly, air is directed by the duct 862 to flow upward through the air radiator 881. The condensate forming in the interior surfaces of the pots drips through the drain 890 to a storage tank 891, where freshwater can be dispensed by the water pump 892 for distribution through the dispenser 893. To avoid cavitation, the pump 892 is controlled by the level meter 894 and the switch 895 to operate only when sufficient water level is achieved in the tank 891.

In a different embodiment, the pots are fabricated from porous ceramics. The porosity of the interior as well as the exterior promotes transpiration cooling through the outer skin of the pots. This will add to the cooling effect produced by evaporation cooling and promote condensation of the water vapor from hot humid air on the surfaces contained in the pot.

When the system of FIG. 15 is used for irrigation, several units can be installed with multiple pots and distributed in the field in a manner that maintains aesthetics of the region.

For application in providing potable water aboard a seagoing ship, deep seawater is used for cooling. The number of pots will depend on the water requirements and the effluent of the seawater can be returned to the open sea, since it is not subject to any contamination. However, disinfection and filtration of the product freshwater is necessary prior to use. Ozonation in this case is the preferred means of disinfection.

While the present invention has been described with references to several embodiments, it will be appreciated by those skilled in the art that the invention may be practiced otherwise than as specifically described herein without departing from the spirit or the scope of invention. It is, therefore, to be understood that the spirit and scope of the invention be limited only by the appended claims.

What is claimed is:

1. A small apparatus for supplying a limited quantity of freshwater and drinking water to meet urgent needs in emergency situations by condensing water vapor entrained in a high humidity, high temperature gas; said apparatus comprising:

a thermoacoustic refrigeration unit for cooling freshwater;

a freshwater connection pipe for circulating a stream of cold freshwater cooled by said thermoacoustic refrigeration unit through a plurality of cooling coils;

a water pump for driving the flow of water in said freshwater connection pipe and said plurality of cooling coils;

regulator means for regulating the circulation of cold freshwater stream in said freshwater connection pipe and said plurality of cooling coils;

condensation means for condensing water vapor from a high humidity, high temperature gas stream;

collection means for collecting the condensate dripping from said condensation means as condensed freshwater;

filtration means for removing suspended particulates from the condensed freshwater collected by said collection means;

storage means for storing filtered freshwater; and dispensing means for distributing the filtered freshwater from said storage means.

2. The apparatus of claim 1, wherein said high humidity, high temperature gas stream is high humidity, high temperature ambient air.

3. The apparatus of claim 1, wherein said high humidity, high temperature gas stream is a mixture of high humidity, high temperature ambient air and high temperature moisture-laden exhaust from an internal combustion engine.

4. The apparatus of claim 1, wherein said high humidity, high temperature gas stream is high temperature moisture-laden exhaust of an internal combustion engine.

5. The apparatus of claim 1, wherein said condensation means comprises:

a rough condensation surface coated with a coat of material that promotes drop-wise condensation, said rough condensation surface in communication with, and cooled by said plurality of cooling coils;

an air blowing means for blowing said high humidity, high temperature gas stream over said rough condensation surface; and an air filtering means for removing suspended particulates from high humidity, high temperature gas stream.

6. The apparatus of claim 1, wherein said condensation means comprises:

a plurality of cooling fins forming an integral part with said plurality of cooling coils for promoting a heat exchange between said high humidity, high temperature gas and condensate-entrained water vapor;

a duct including an oblique prism section having substantially rectangular-shaped faces and substantially trapezoidal-shaped lateral faces and a substantially rectangular-shaped parallelopiped section, said duct enclosing said plurality of cooling coils and said plurality of cooling fins;

air suction means for admitting said high humidity, high temperature gas stream through an open substantially rectangular-shaped inlet of said duct, said air suction means directing said high humidity, high temperature gas stream over said plurality of coils and said plurality of cooling fins and discharging said high humidity, high temperature gas stream through a narrow substantially rectangular-shaped outlet of said duct;

air filtering means for removing suspended particulates from said high humidity, high temperature gas stream at said open substantially rectangular-shaped inlet of said duct; and tilted passage means positioned at a bottom surface of said duct for draining condensate dripping from said plurality of cooling fins.

7. The apparatus of claim 1, wherein said condensation means comprises:

a substantially conical-shaped duct including a plurality of concentric substantially conical-shaped condensation surfaces, an outer surface of said substantially conical-shaped duct being covered by said plurality of cooling coils;

air suction means for admitting said high humidity, high temperature gas stream through an inlet end of said substantially conical-shaped duct, said air suction means directing said high humidity, high temperature gas stream over said plurality of concentric substantially conical-shaped condensation surfaces and discharging said high humidity, high temperature gas stream upon drying and cooling said high humidity, high temperature gas stream from an outlet end of substantially conical-shaped duct;

air filtering means for removing suspended particulates from said high humidity, high temperature gas stream at said inlet end of said substantially conical-shaped duct; and a tilted passage means at the bottom of said substantially conical-shaped duct to drain condensate dripping from said plurality of concentric conical condensation surfaces.

8. The apparatus of claim 1, wherein said condensation means is a condensating plate.

9. The apparatus of claim 8, wherein the surface of said condensating plate is corrugated.

10. The apparatus of claim 9, wherein the surface of said condensating plate comprises hair-like fins.

11. The apparatus of claim 8, wherein the surface of said condensating plate is covered with one of teflon or silicon.

12. A process for the emergency supply of freshwater through the condensation of water vapor from hot moisture-laden gas, said process comprising the steps of:

cooling a charge of freshwater flowing in a pipe by thermoacoustic refrigeration;

circulating substantially cold freshwater by a water pump through a plurality of cooling coils;

regulating the flow of the substantially cold freshwater through said pipe;

directing high humidity, high temperature gas to said condensation surfaces;

directing said high humidity, high temperature gas over said plurality of said condensation surfaces;

condensing water vapor contained in said high humidity, high temperature gas on said plurality of condensation surfaces;

collecting condensate from said plurality of condensation surfaces as condensed freshwater;

disinfecting the condensed freshwater collected from said plurality of condensation surfaces;

filtering the disinfected freshwater to obtain a supply of potable water;

storing the potable water; and dispensing the potable water.

13. The process of claim 12 wherein the step of cooling the plurality of condensation surfaces further comprises the steps of providing a metallic plate having a back surface and a front surface having a substantially rough surface coated with a material that promotes drop-wise condensation, and positioning said plurality of cooling coils on said back surface.

14. The process of claim 12, wherein the step of cooling the plurality of condensation surfaces further comprises the steps of:

placing a plurality of fins on a surface of said plurality of cooling coils, said plurality of cooling coils serving to cool the fins; and providing a duct for enclosing said plurality of cooling coils and said plurality of fins, said duct directing the flow of high humidity, high temperature gas.

* * * * *